(12) United States Patent
Asai et al.

(10) Patent No.: US 11,074,876 B2
(45) Date of Patent: *Jul. 27, 2021

(54) STEREOSCOPIC DISPLAY DEVICE

(71) Applicant: NLT TECHNOLOGIES, LTD., Kanagawa (JP)

(72) Inventors: Takuya Asai, Kanagawa (JP); Koji Shigemura, Kanagawa (JP)

(73) Assignee: TIANMA MICROELECTRONICS CO., LTD., Shenzhen (CN)

( * ) Notice: Subject to any disclaimer, the term of this patent is extended or adjusted under 35 U.S.C. 154(b) by 896 days.

This patent is subject to a terminal disclaimer.

(21) Appl. No.: 14/976,635

(22) Filed: Dec. 21, 2015

(65) Prior Publication Data

US 2016/0182897 A1    Jun. 23, 2016

(30) Foreign Application Priority Data

Dec. 22, 2014  (JP) .............................. JP2014-258569
Oct. 13, 2015  (JP) .............................. JP2015-202119

(51) Int. Cl.
*G09G 3/36*       (2006.01)
*H04N 13/31*     (2018.01)
(Continued)

(52) U.S. Cl.
CPC ......... *G09G 3/3607* (2013.01); *H04N 13/305* (2018.05); *H04N 13/31* (2018.05); *H04N 13/317* (2018.05)

(58) Field of Classification Search
None
See application file for complete search history.

(56) References Cited

U.S. PATENT DOCUMENTS 5,953,148 A * 9/1999 Moseley ............ G02B 27/2214
                                                     359/237
8,692,871 B2    4/2014 Harrold et al.
(Continued)

FOREIGN PATENT DOCUMENTS

CN    102109715 A    6/2011
CN    103210341 A    7/2013
(Continued)

OTHER PUBLICATIONS

Communication dated Aug. 21, 2018 issued by the Intellectual Property Office of People's Republic of China in counterpart application No. 201510971667.0.
(Continued)

*Primary Examiner* — Edward J Glick
*Assistant Examiner* — Anthony G Quash
(74) *Attorney, Agent, or Firm* — Sughrue Mion, PLLC

(57) ABSTRACT

To provide a naked-eye type stereoscopic display device which can achieve a fine stereoscopic display property while achieving high-definition display and high yield. An aperture part includes overlapping regions which overlap with an aperture part or another aperture part neighboring to each other in a second direction and a non-overlapping region which does not overlap. Provided that a light amount emitted from a linear aperture of the aperture part in parallel to a second direction is "longitudinal light amount", the non-overlapping region includes longitudinal light amount fluctuating regions where the longitudinal light amount changes continuously from roughly a center of the aperture part towards both ends of the first direction, respectively. The sum of the longitudinal light amounts of the two overlapping regions overlapping with each other at a same position in the first direction is larger than the longitudinal light amount in roughly the center of the aperture part.

7 Claims, 25 Drawing Sheets

(51) Int. Cl.
*H04N 13/317* (2018.01)
*H04N 13/305* (2018.01)
*G02F 1/1343* (2006.01)
*G06F 3/0481* (2013.01)
*G06F 15/80* (2006.01)
*G02B 30/34* (2020.01)

(56) References Cited

U.S. PATENT DOCUMENTS

| | | | |
|---|---|---|---|
| 9,022,564 B2 | 5/2015 | Watanabe et al. | |
| 9,217,872 B2 | 12/2015 | Niioka et al. | |
| 9,606,367 B2 | 3/2017 | Yoshino et al. | |
| 2010/0157228 A1* | 6/2010 | Sakurai | G02F 1/1337 349/141 |
| 2011/0187948 A1* | 8/2011 | Kashiwagi | G02F 1/1335 349/15 |
| 2012/0113100 A1* | 5/2012 | Niioka | H04N 13/305 345/419 |
| 2012/0268481 A1* | 10/2012 | Niioka | H04N 13/317 345/619 |
| 2013/0249976 A1 | 9/2013 | Kunieda et al. | |
| 2013/0250409 A1* | 9/2013 | Otose | G02B 27/2214 359/463 |
| 2013/0314512 A1 | 11/2013 | Watanabe et al. | |
| 2014/0098308 A1 | 4/2014 | Wu et al. | |
| 2014/0240827 A1 | 8/2014 | Asai et al. | |
| 2014/0292732 A1* | 10/2014 | Niioka | G02B 27/22 345/204 |
| 2016/0182898 A1* | 6/2016 | Asai | G02B 27/2214 348/54 |

FOREIGN PATENT DOCUMENTS

| | | |
|---|---|---|
| CN | 103698929 A | 4/2014 |
| JP | 10-186294 A | 7/1998 |
| JP | 2008-249887 A | 10/2008 |
| JP | 2012-63556 A | 3/2012 |
| JP | 2013-148894 A | 8/2013 |
| JP | 2014194524 A | 10/2014 |
| WO | 2014/061548 A1 | 4/2014 |

OTHER PUBLICATIONS

Communication dated Aug. 6, 2019, from the Japanese Patent Office in application No. 2015-202119.

* cited by examiner

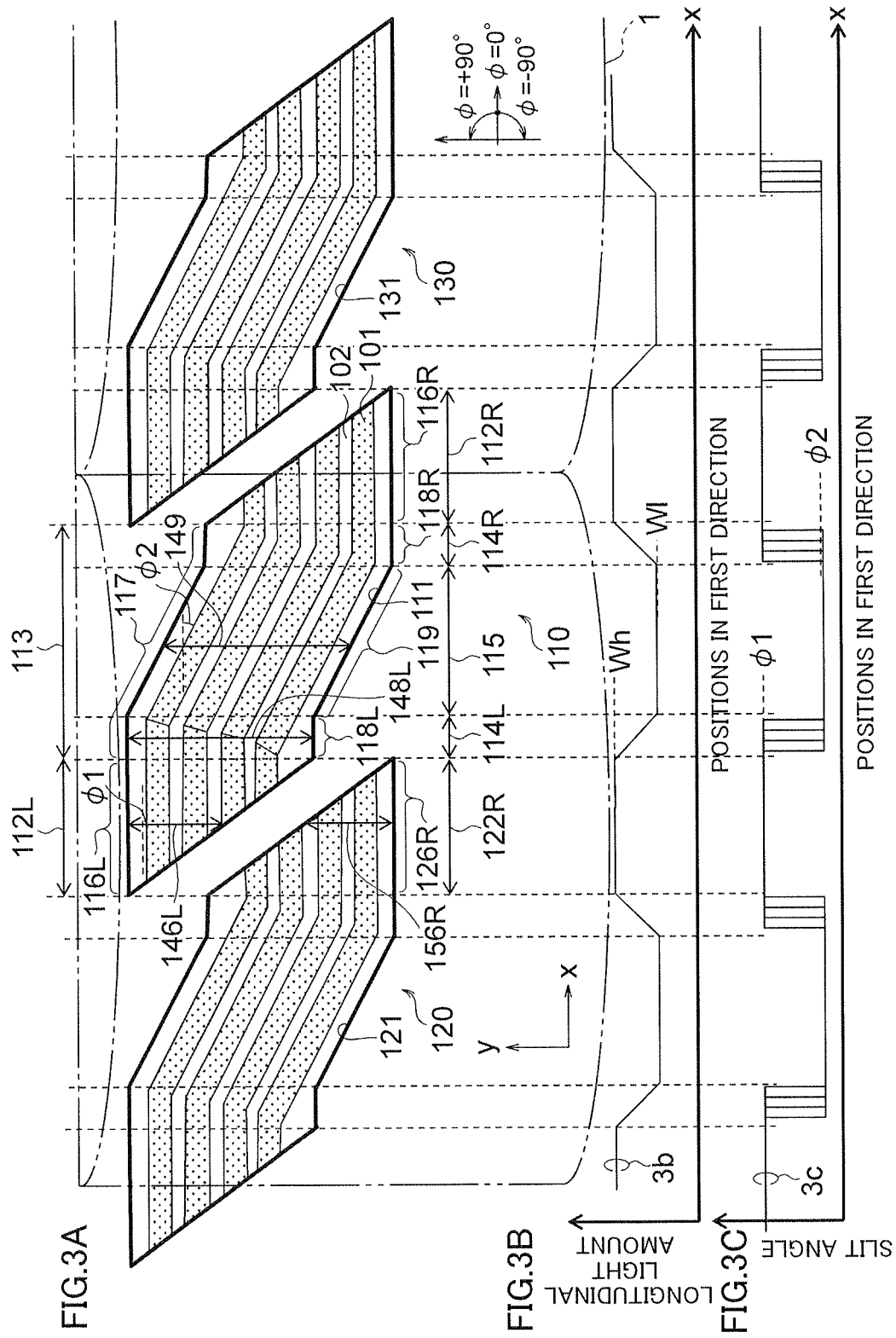

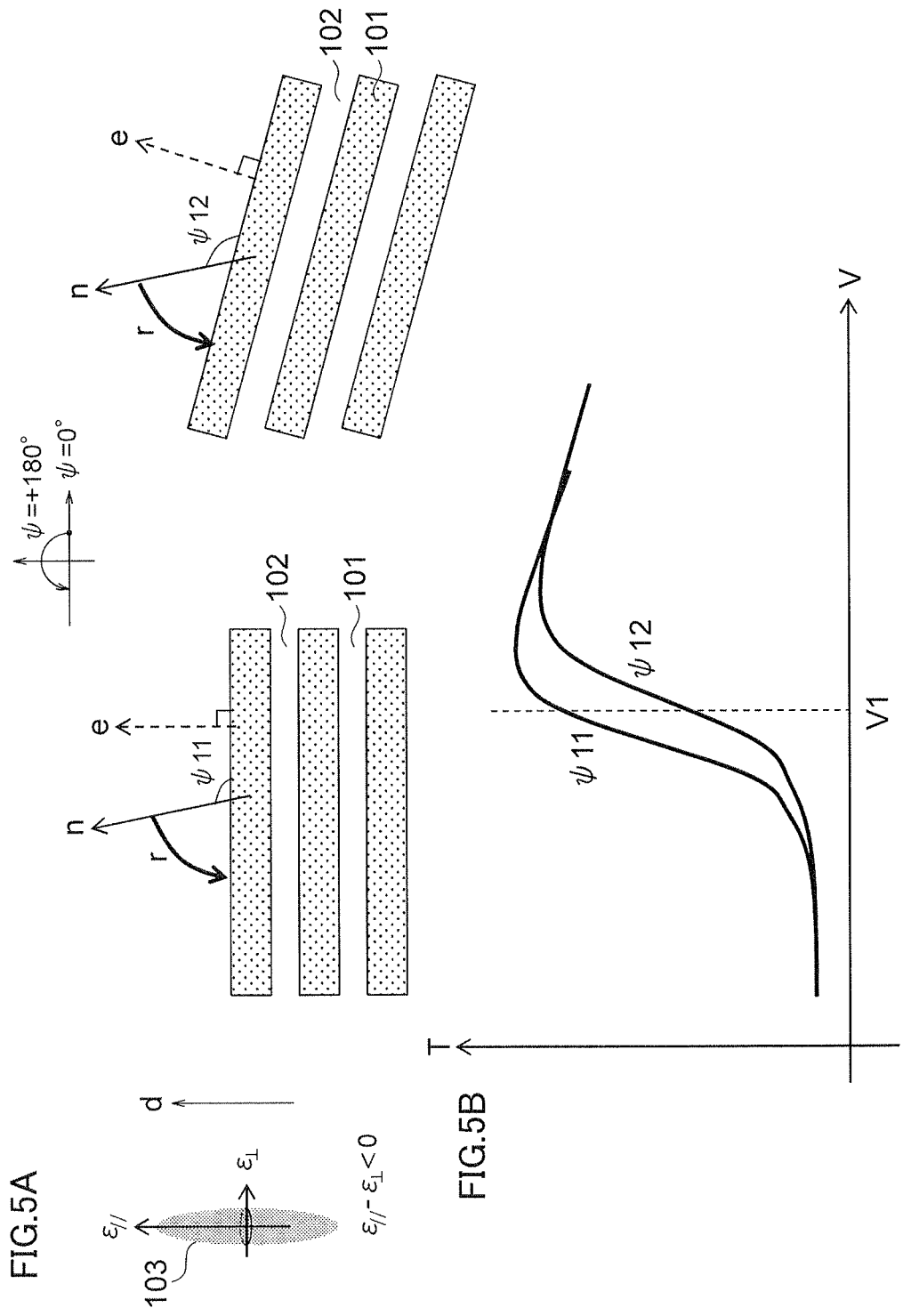

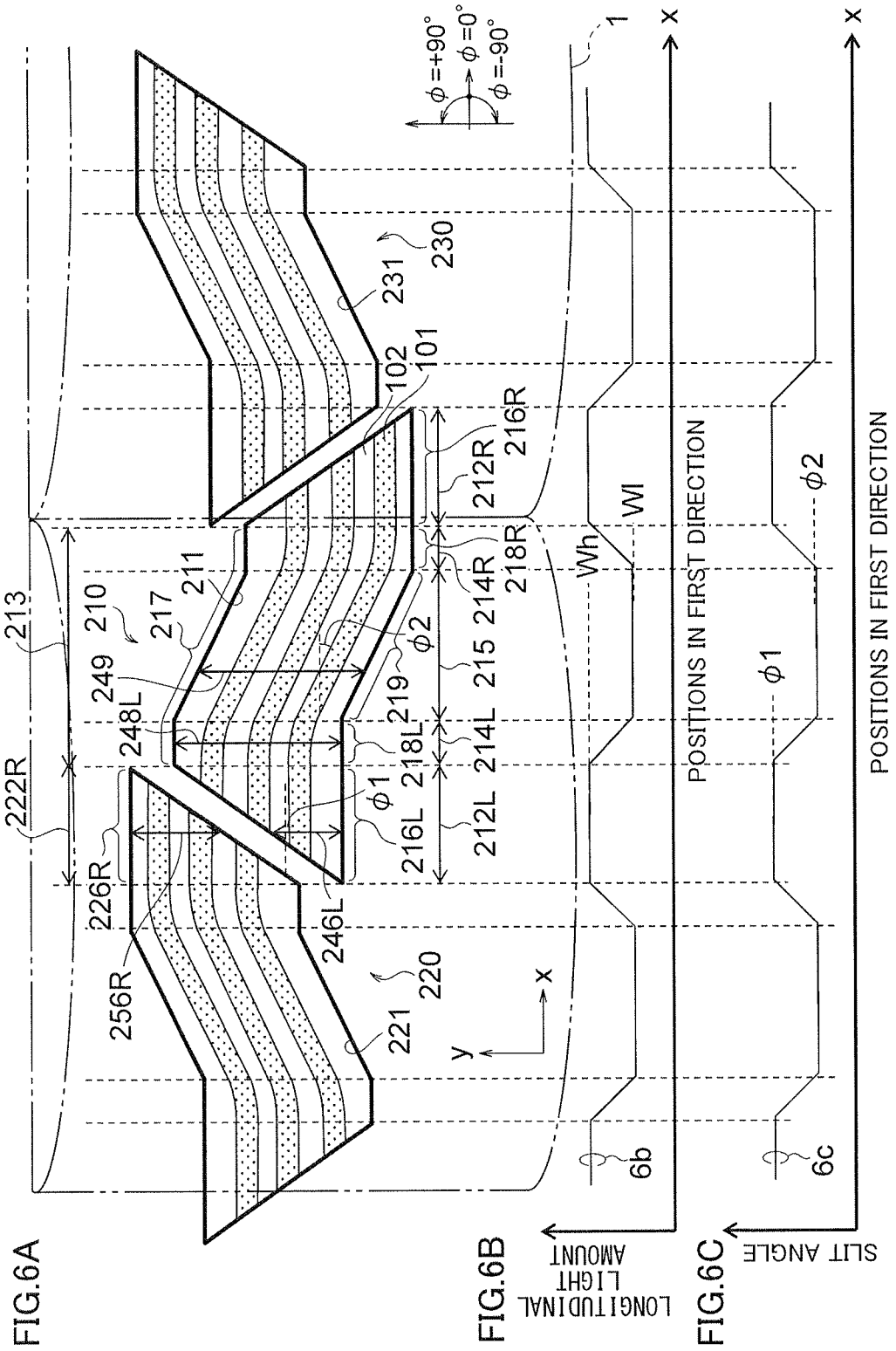

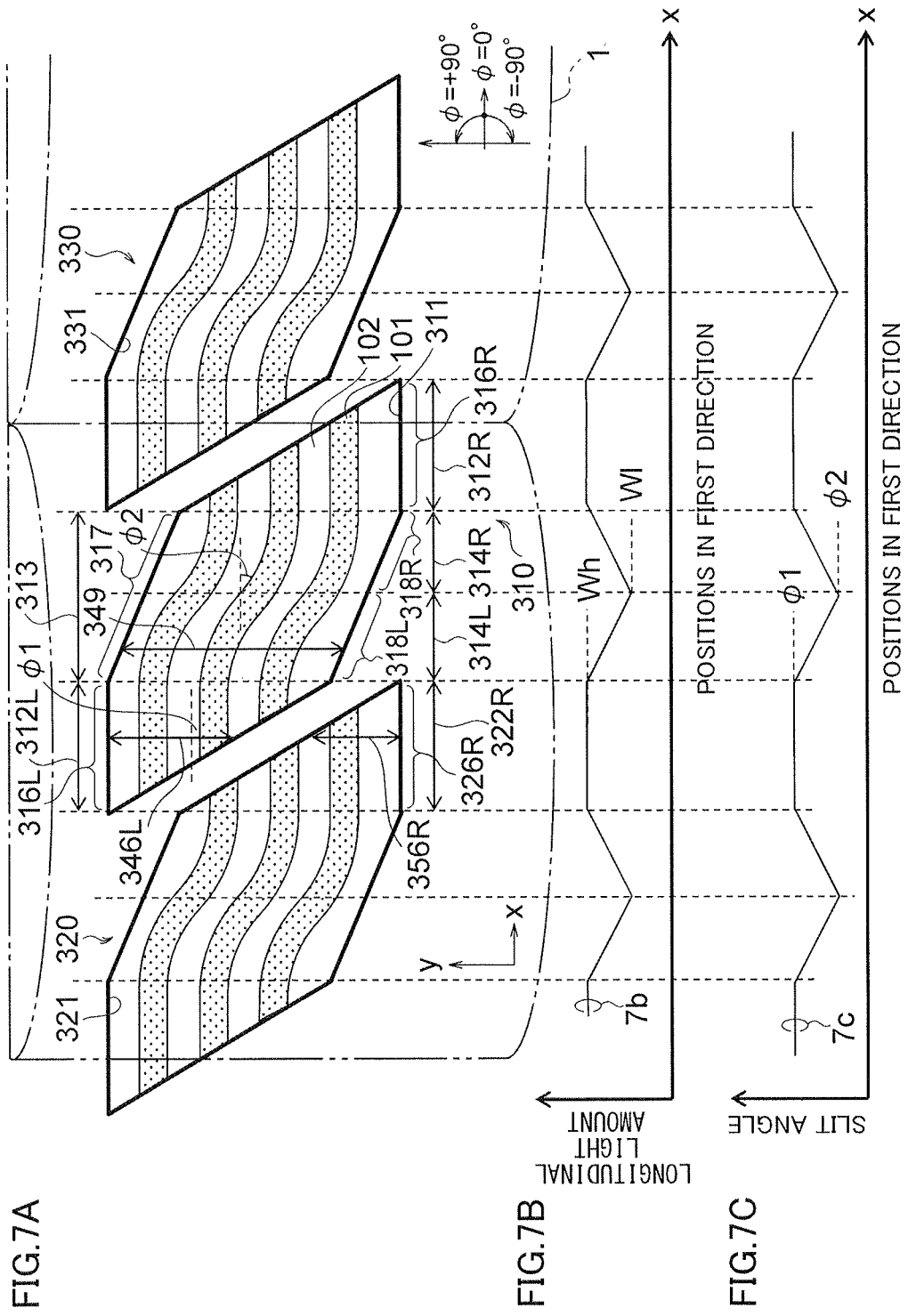

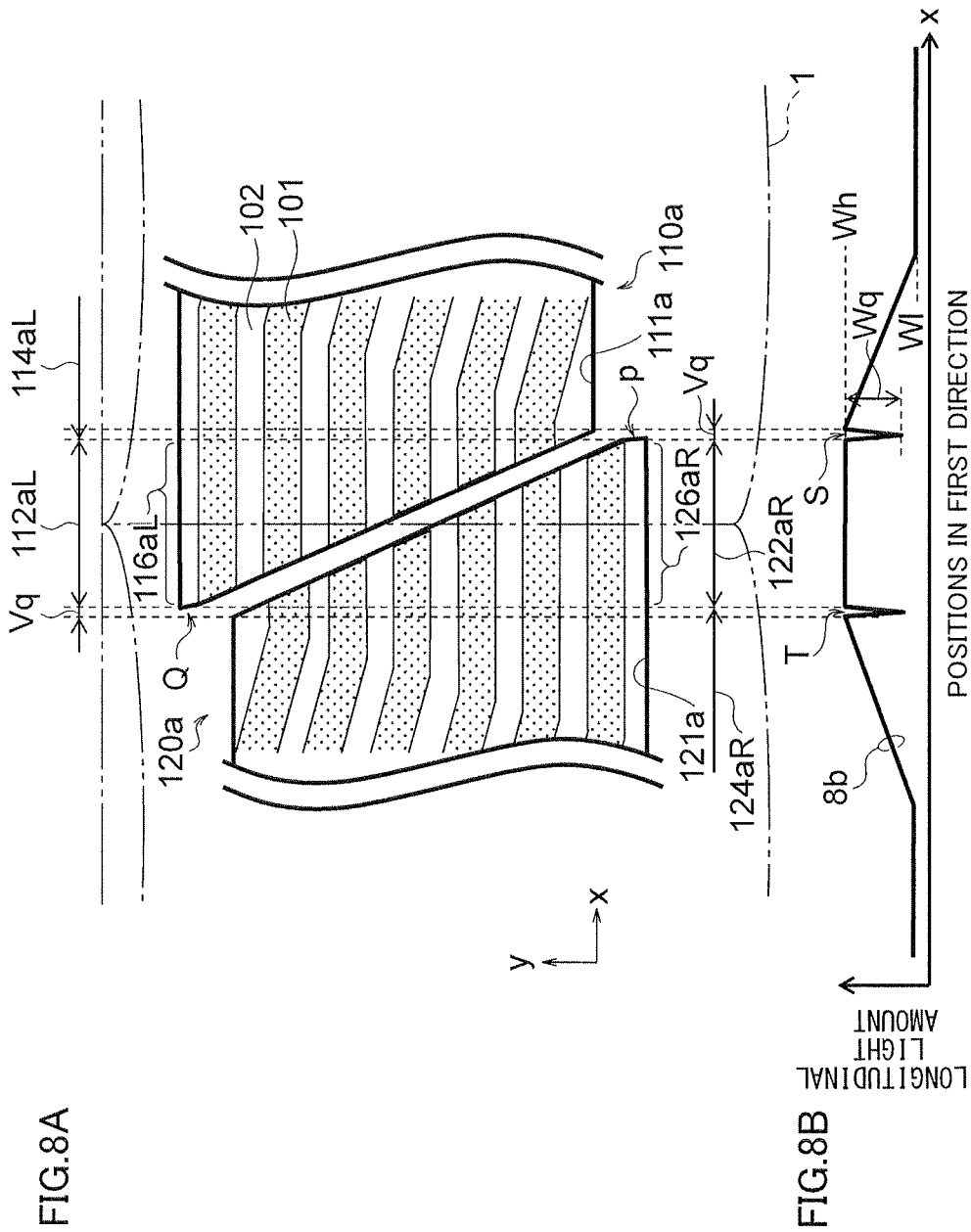

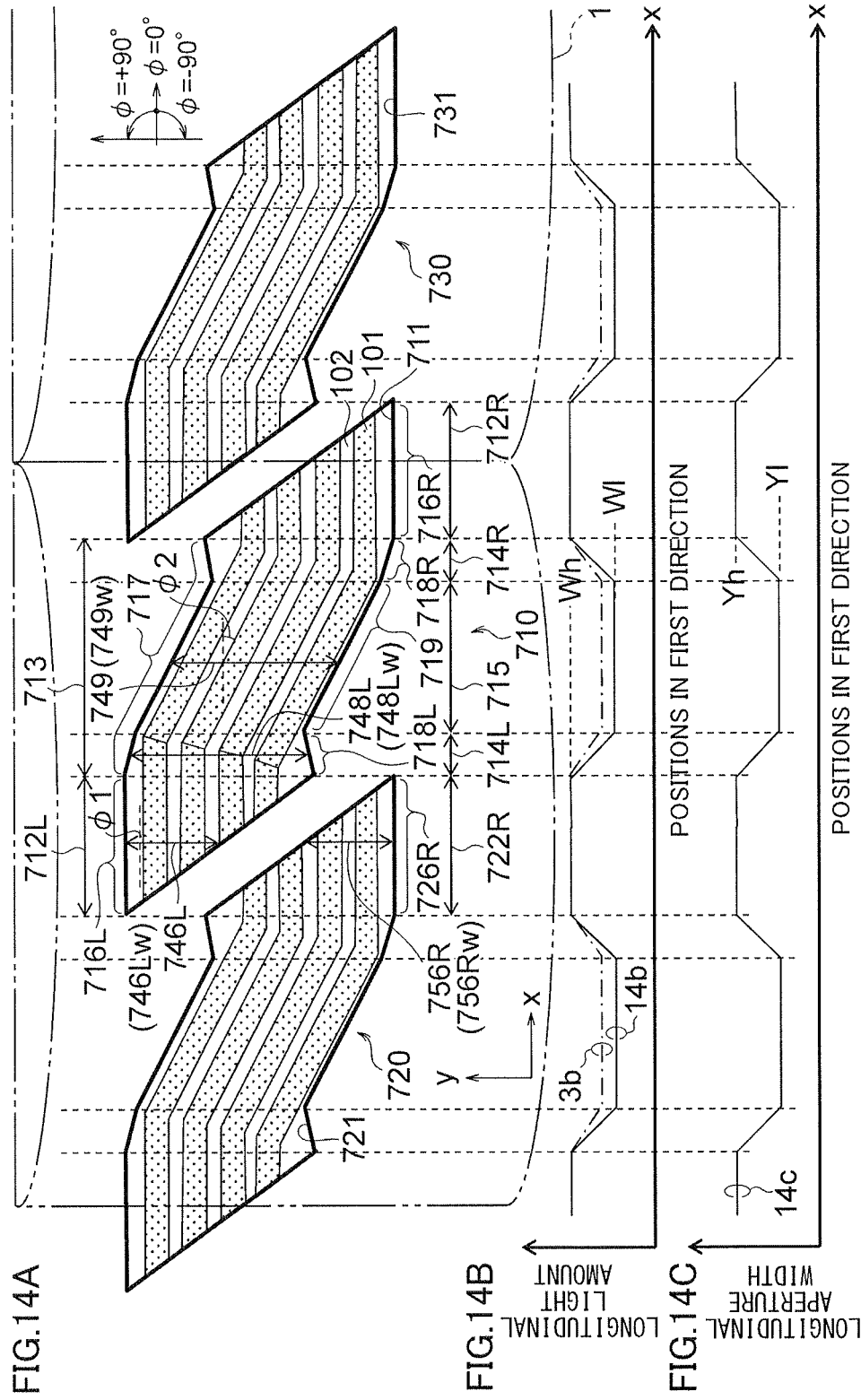

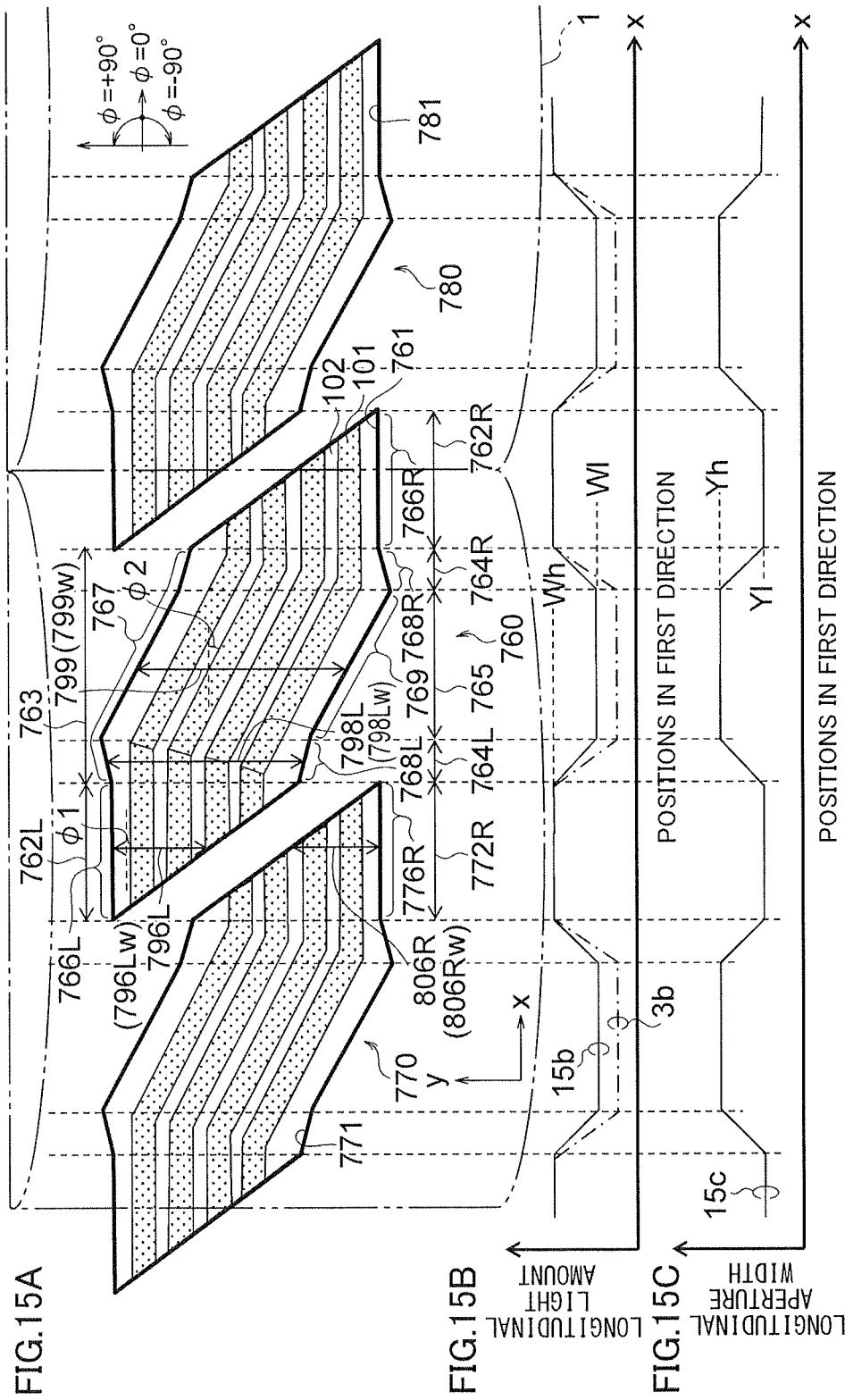

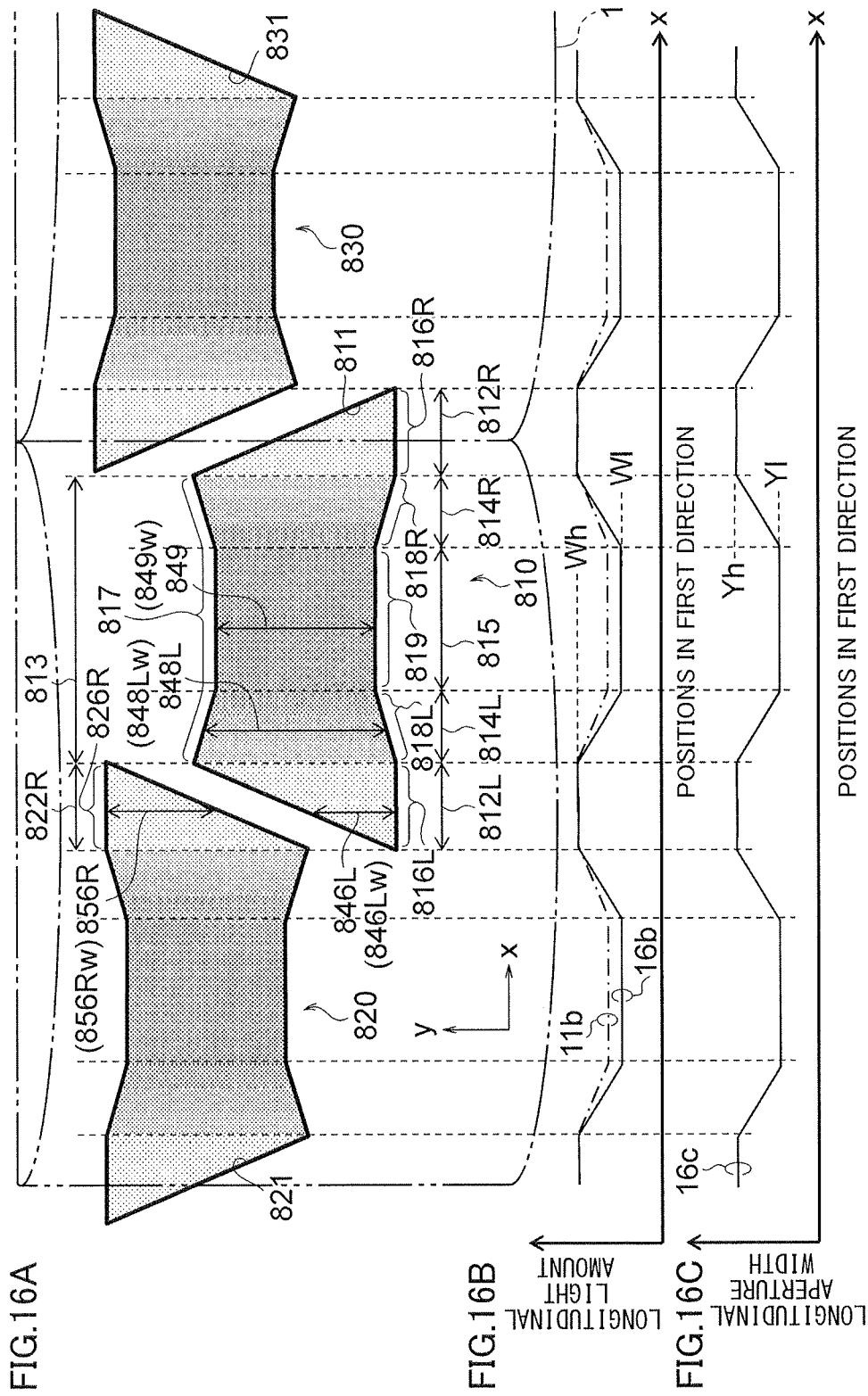

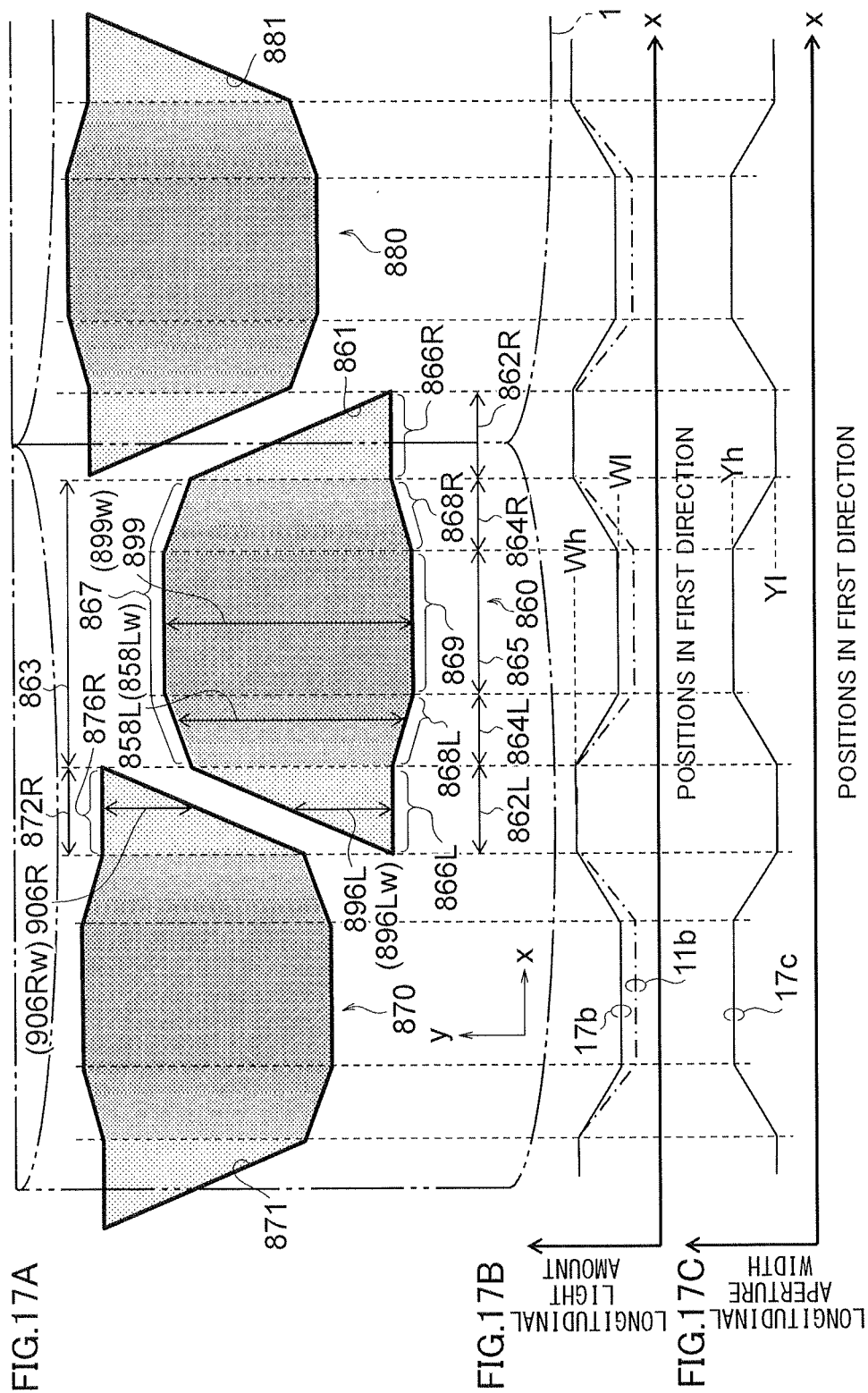

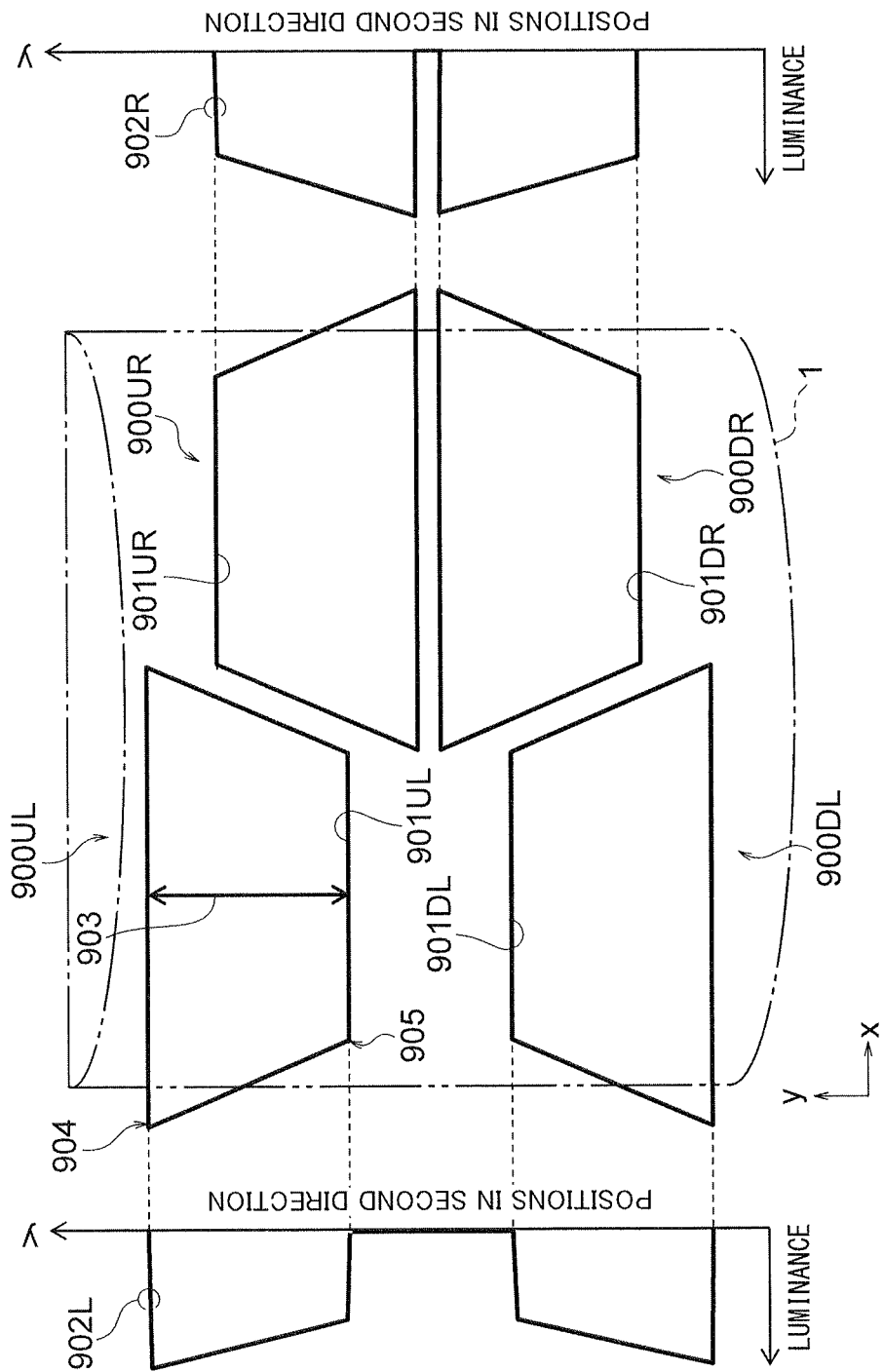

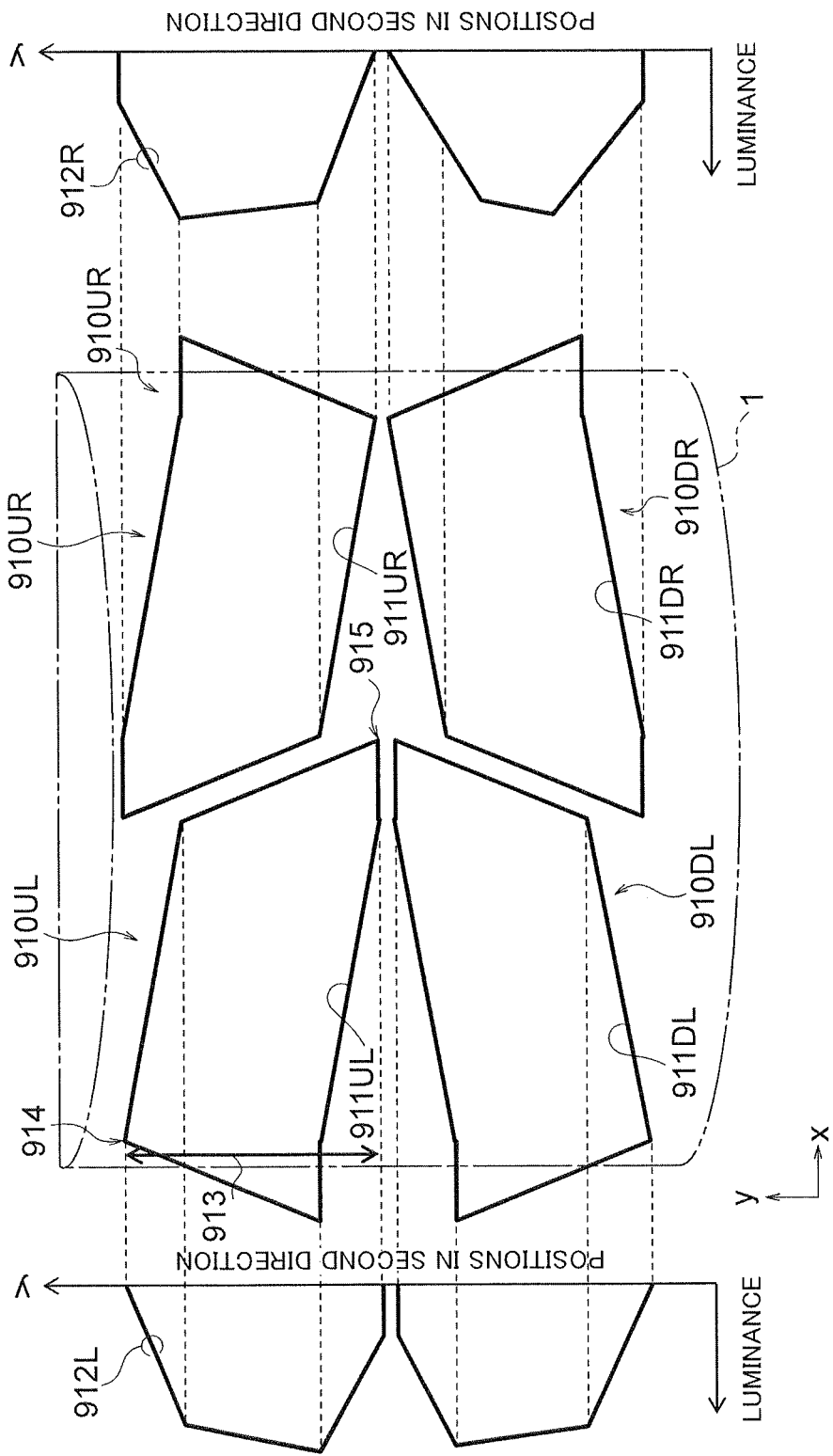

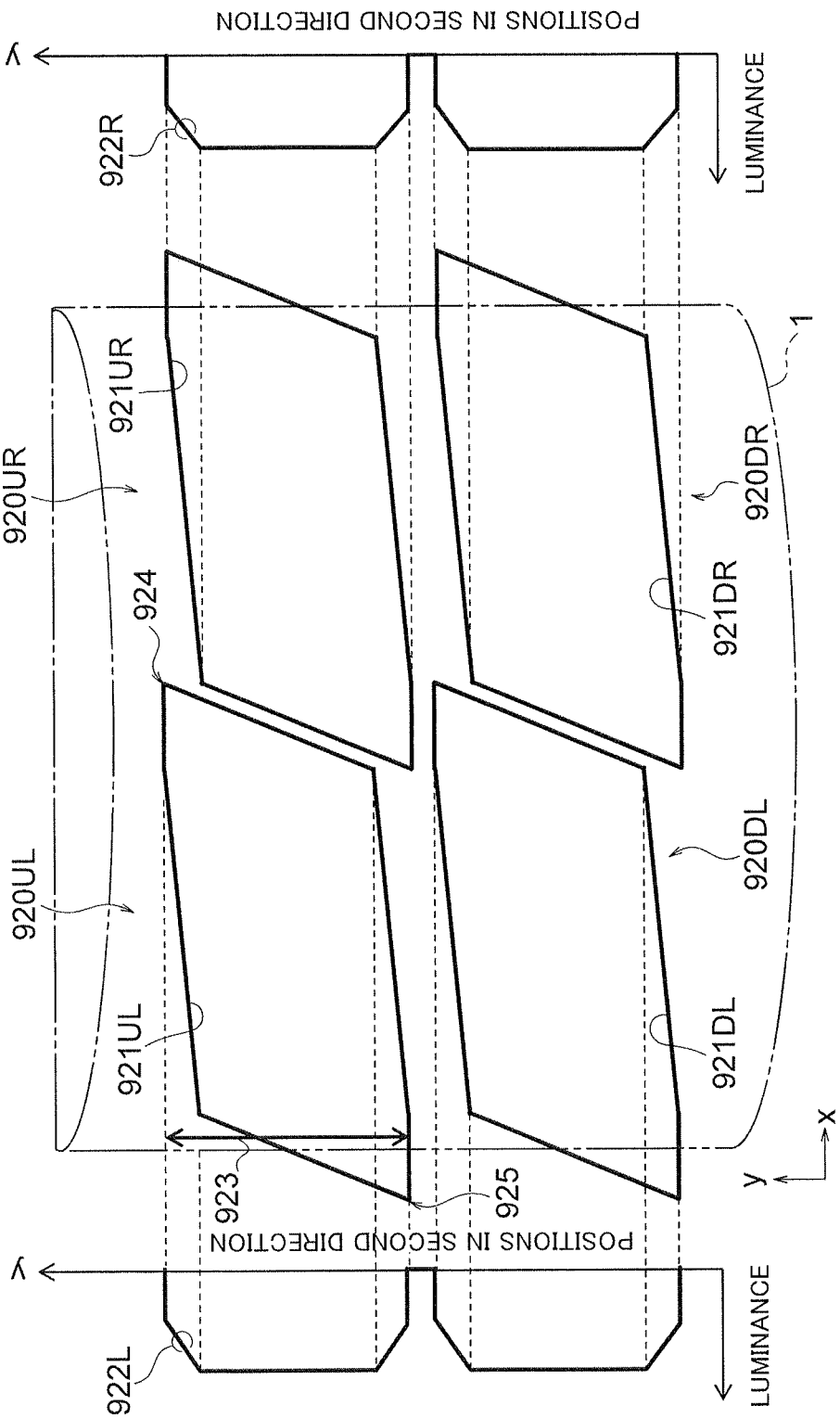

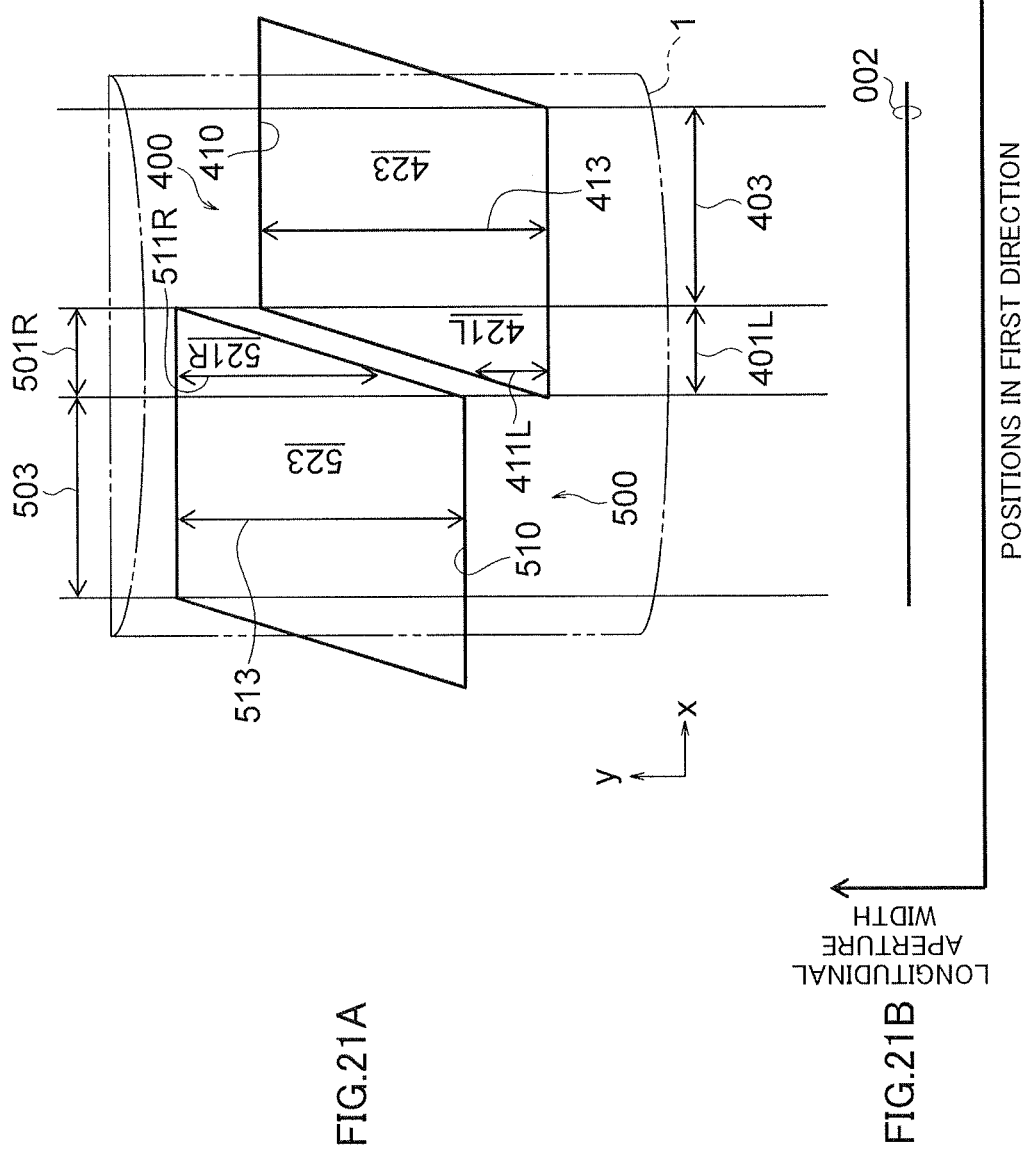

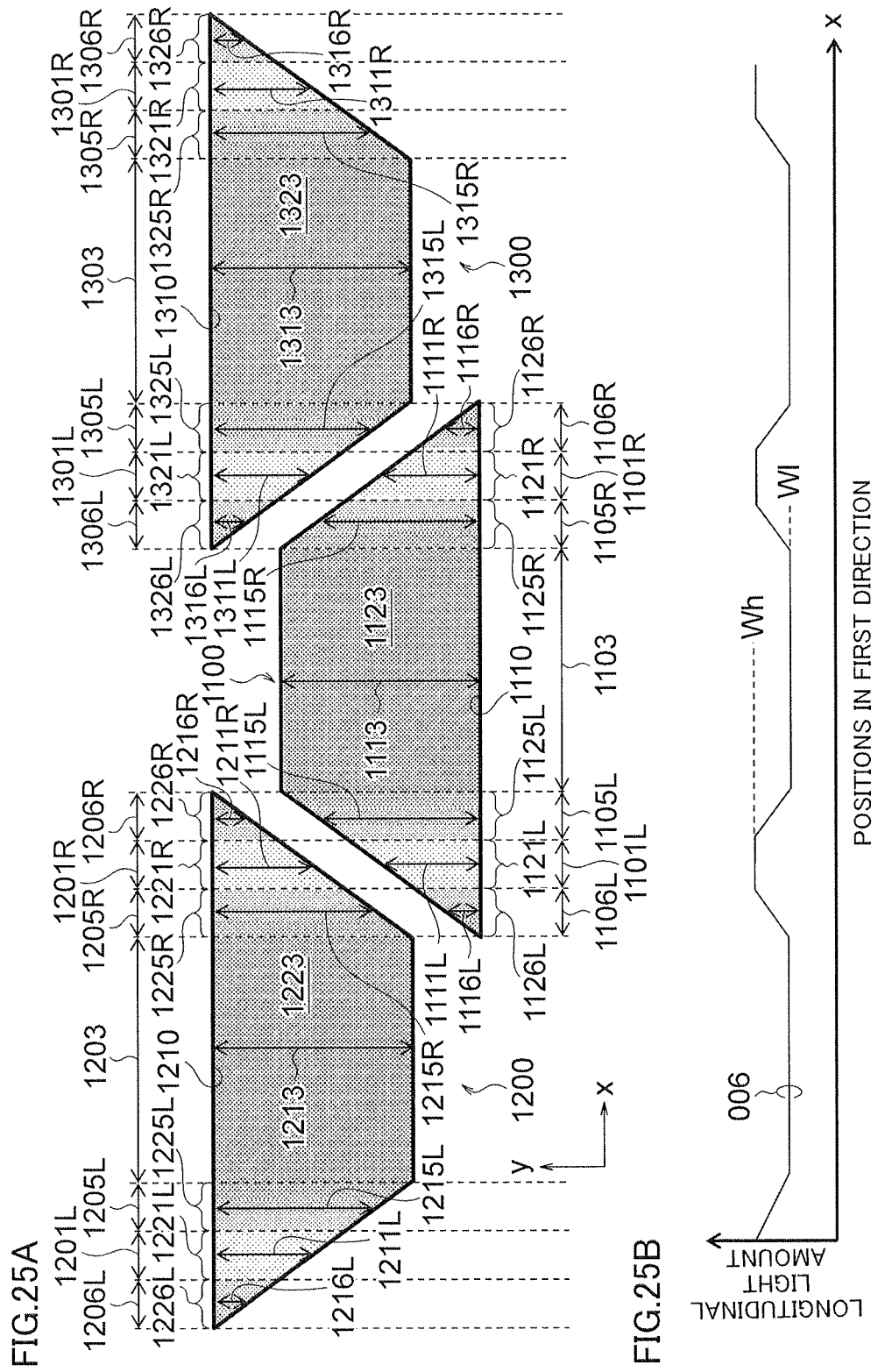

STEREOSCOPIC DISPLAY DEVICE

CROSS-REFERENCE TO RELATED APPLICATION

This application is based upon and claims the benefit of priority from Japanese patent application No. 2014-258569, filed on Dec. 22, 2014, and Japanese patent application No. 2015-202119, filed on Oct. 13, 2015, the disclosure of which is incorporated herein in its entirety by reference.

BACKGROUND OF THE INVENTION

1. Field of the Invention

The present invention relates to a stereoscopic display device which provides stereoscopic images to observers with naked eyes.

2. Description of the Related Art

A naked-eye type stereoscopic display device does not require any special eyeglasses, so that the observer can enjoy stereoscopic images readily. With personal mobile terminals such as mobile phones, smartphones, and feature phones and household display devices such as television set receivers, such techniques for achieving in naked-eye type stereoscopic display are being developed rapidly.

The naked-eye type stereoscopic display techniques achieves stereoscopic display by giving directivity to the light emitted from a display and providing parallax images to each of the both eyes of an observer. Examples thereof may be a 2-viewpoint stereoscopic image display technique, a multiple-viewpoint stereoscopic image display technique, and an integral photography (IP) technique.

There are various members as a light-ray control module for giving the directivity to the emitted light. Examples thereof may be a type which utilizes a lens or a barrier on the display surface and a type in which the light emitted from the display device itself has the directivity.

A display panel is typically formed by arranging, in a matrix form, pixels each displaying a minimum element of an image. In a naked-eye type stereoscopic display device, it is necessary to display viewpoint images corresponding to the number of viewpoints. Thus, sub-pixels for displaying minimum elements of the viewpoint images are required further.

Note here that there are cases where an element having a color expressing function for displaying a color of an image is referred to as a "sub-pixel". For example, such term is used in an expression "a pixel constituted with sub-pixels of red, green and blue". However, if it is not specifically mentioned, the "sub-pixel" in the current Specification is defined to be an element including a viewpoint image displaying function for convenience. Note that the sub-pixel in the current Specification can also include a color expressing function.

The sub-pixel is a device for converting an electric signal into an optical signal. The region between a sub-pixel and another sub-pixel is a region where optical conversion cannot be done. A part in that region, which is not intended to be viewed, is viewed by an observer in an expanded manner due to the light-ray control module, thereby giving a sense of discomfort to the observer. The state of such image quality is referred to as 3D moiré.

As a countermeasure for 3D moiré, there is proposed a related technique with which an overlapping region is provided in optical aperture parts of two sub-pixels neighboring to each other in the viewpoint direction and the total values of the longitudinal aperture widths are set to be constant (Japanese Unexamined Patent Publication Hei 10-186294 (Patent Document 1)). Further, also proposed is a related technique with which the total values of the longitudinal aperture widths are set to be constant by utilizing the sub-pixels arranged over a plurality of rows (Japanese Unexamined Patent Publication 2008-249887 (Patent Document 2)). Furthermore, also proposed is a related technique with which the visibility of 3D moiré is decreased by devising the longitudinal aperture widths in the overlapping regions of the sub-pixels (Japanese Unexamined Patent Publication 2012-063556 (Patent Document 3)).

However, there is such an issue that the visibility of 3D moiré cannot be decreased sufficiently even when the above-described related techniques are used. This issue will be described in details hereinafter by using FIG. 21A to FIG. 24.

The following analysis has been made by the present inventors.

Referring to FIG. 21A, an ideal sub-pixel structure will be described. Two sub-pixels 400 and 500 are disposed neighboring to each other in a first direction x. Lenses 1 as a light-ray control modules are disposed at positions corresponding to the sub-pixels 400, 500 along the first direction x repeatedly. Due to such structure, the first direction x coincides with the light-ray separating direction. Note that shapes of optical aperture parts 410, 510 of the two sub-pixels 400, 500 are considered to be roughly in a parallelogram form for convenience sake in terms of explanation.

First, considered is a case where the aperture part 410 is divided into two sections in the first direction x. In a certain section along the first direction x, the aperture part 410 overlaps with the aperture part 510 in a second direction y. Such section is referred to as an overlapping section 401L. Further, in the other section along the first direction x, the aperture part 410 does not overlap with the aperture part 510 in the second direction y. Such section is referred to as an aperture width constant section 403.

Accordingly, the shape of the aperture part 410 is also considered by dividing it into two regions along the first direction x. Out of the aperture part 410, a region belonging to the overlapping section 401L is referred to as an overlapping region 421L, while a region belonging to the aperture width constant section 403 is referred to as an aperture width constant region 423. This can be considered the same in the case of the neighboring aperture part 510. Out of the aperture part 510, a region belonging to an overlapping section 501R is referred to as an overlapping region 521R, while a region belonging to an aperture width constant section 503 is referred to as an aperture width constant region 523. Note that the overlapping sections are the sections regulated by overlap of the aperture parts 410 and 510 in the second direction y, so that the positions of the overlapping sections 401L and 501R in the first direction x coincide with each other.

Now, the width of the second direction y out of the widths of the aperture part is defined as "longitudinal aperture width". The longitudinal aperture widths 413, 513 of the aperture width constant regions 423, 523 are constant regardless of the positions in the first direction x. In the meantime, the longitudinal aperture widths 411L, 511R in the overlapping sections 401L, 501R vary according to the positions in the first direction x.

Further, at the same position in the first direction x within the overlapping sections 401L and 501R, the value of "411L+511R" that is the sum of the longitudinal aperture widths 411L and 511R (referred to as "sum of longitudinal aperture widths" hereinafter) is constant. Further, the sum of the longitudinal aperture widths "411L+511R" and the longitudinal aperture width 413 as well as the longitudinal aperture width 513 take the same values with each other.

Next, let's look into the total value of the longitudinal aperture widths of a sub-pixel group arranged in the first direction among the sub-pixels arranged in matrix on a display panel. FIG. 21B is a graph showing, with a plot 002, the relation between the positions in the first direction x and the total value of the longitudinal aperture widths in the ideal sub-pixel structure shown in FIG. 21A. Note here that the total value of the longitudinal aperture widths is the sum of the two longitudinal aperture widths "411L+511R" in the overlapping regions 401L and 501R. It is the value of the longitudinal aperture width 413 in the aperture width constant section 403, while it is the value of the longitudinal aperture width 513 in the aperture width constant section 503.

As described above, the sum of the longitudinal aperture widths "411L+511R", the longitudinal aperture width 413, and the longitudinal aperture width 513 take the same values with each other, so that the plot 002 is always constant for the positions in the first direction x. Thereby, generation of 3D moiré in the light-ray separating direction is to be suppressed.

Incidentally, there are various elements for constituting the optical aperture shapes of actual sub-pixels depending on the types of the electro-optical elements. Examples thereof are a black matrix, signal wirings, and the like in a liquid crystal display, partition walls, display electrodes and the like in a plasma display, a light emission layer region, signal wirings, and the like in an organic EL display. Each of those elements is manufactured by using a photolithography technique in general. Thus, the precision of those shapes depends on the pattern precision of the photolithography technique.

Considering the currently used typical materials and manufacturing devices for photolithography, it is difficult to completely eliminate processing variation of about several μm as the shape precision. Further, in order to control the processing variation to be less than the order of sub-μm level, expensive materials and manufacturing devices are required. Thus, it is difficult to provide inexpensive stereoscopic image display devices. There is not a little shape dependency existing in the processing variation. Especially, the processing precision variation of a bent shape including an acute angle is relatively large. Due to the processing precision variation, fluctuation may be generated in the quality of the acquired products, e.g., the corner of the optical aperture part of the sub-pixel may be rounded, the optical aperture part may become small or large as a whole, and the like.

FIG. 22A is an explanatory chart showing changes in the longitudinal aperture width when the corner of the aperture part is rounded with respect to the ideal sub-pixel structure shown in FIG. 21A. The ideal sub-pixel aperture parts 410, 510 and the aperture parts 410a, 510a of the sub-pixels 400a, 500a having rounded corners P, Q are illustrated in a corresponding manner. The aperture part 410a includes an overlapping region 421aL, an aperture width fluctuating region 422aL, and an aperture width constant region 423a, while the aperture part 510a includes an overlapping region 521aR, an aperture width fluctuating region 522aR, and an aperture width constant region 523a.

The overlapping sections 401aL, 501aR of the aperture parts 410a, 510a having the rounded corners P, Q become smaller than the overlapping sections of the ideal aperture parts 410, 510. Further, because of this change, an aperture width fluctuating section 402aL appears between the overlapping section 401aL and the aperture width constant section 403a, and an aperture width fluctuating section 502aR appears between the overlapping section 501aR and the aperture width constant section 503a. Those aperture width fluctuating sections 402aL, 502aR are generated when the parts to become overlapping sections with the ideal aperture parts 410, 510 come to have the rounded corners P, Q due to the processing precision variation so that the aperture parts do not exist in those sections.

FIG. 22B shows the results acquired by paying attention to the positions in the first direction and the total values of the longitudinal aperture widths of the sub-pixel group arranged in the first direction in such case. That is, FIG. 22B is a graph showing the relation between the positions in the first direction and the total values of the longitudinal aperture widths regarding the aperture part having the rounded corner.

As shown with a plot 002a in FIG. 22B, in accordance with the appearance of the aperture width fluctuating sections 402aL, 502aR caused by the influence of the rounded corners Q, P, positions S, T at which the value of the longitudinal aperture width radically decreases in those sections are generated locally. Other than the positions S, T, the value of the sum of the longitudinal aperture widths "411aL+511aR" of the other overlapping sections 401aL, 501aR and each of the values of the longitudinal aperture widths 413a, 513a of the aperture width constant sections 403a, 503a do not change since those are not affected by the rounded corners P, Q.

There are a longitudinal aperture width change value Wq' and a longitudinal aperture width change section Vq' at the positions S and T. The longitudinal aperture width change value Wq' depends on the angle θ of a side (e.g., an aperture side 400aA, 500aB, or the like) existing in the overlapping section within the aperture part with respect to the first direction x. Further, the longitudinal aperture width change section Vq' depends on the size of the rounded corners P, Q in addition to the extent of the angle θ.

FIG. 23 is a graph showing the relations regarding the angle θ of the aperture part, the longitudinal aperture width change value Wq', and the longitudinal aperture width change section Vq' in a case where the corner of the aperture part is rounded.

As shown in FIG. 23, when the angle θ becomes larger, the longitudinal aperture width change value Wq' becomes larger while the longitudinal aperture width change section Vq' becomes smaller. Inversely, when the angle θ becomes smaller, the longitudinal aperture width change value Wq' becomes smaller while the longitudinal aperture width change section Vq' becomes larger. Therefore, in terms of 3D moiré, it is advantageous to have a smaller angle θ. However, when the angle θ is too small, the overlapping section of the sub-pixels becomes extremely large so that the 3D crosstalk property tends to be deteriorated.

Further, in a case where the sub-pixel size and the layout pitch are designed to be small in accordance with the recent tendency of ultra-high definition, the angle θ also becomes large. Thus, 3D moiré is deteriorated as described above. Therefore, with the ideal sub-pixel structure shown in FIG. 21A, it is essential to deal with such issue.

FIG. 24 is a chart showing 3D moiré generated when the value of the longitudinal aperture width is decreased radically due to rounding of the corner shown in FIG. 22B by using the relation between the observer and stereopsis regions. The lateral axis of FIG. 24 shows the observing angles in the first direction, and the longitudinal axis shows the luminance distribution with respect to the observing angles. The two kinds of dotted lines show the luminance distributions when an image is outputted only to either one of the pixels, assuming that a sub-pixel 400a is a right-eye pixel and a sub-pixel 500a is a left-eye pixel. That is, Y1 is the luminance distribution when white is displayed on the right-eye pixel and black is displayed on the left-eye pixel, Y2 is the luminance distribution when black is displayed on the right-eye pixel and white is displayed on the left-eye pixel, and Y3 is the luminance distribution when white is displayed on the both pixels. Basically, the relation regarding the luminance can be expressed as Y3=Y1+Y2.

Note here that a right-eye observing region is 800R, and a left-eye observing region is 800L. As shown in FIG. 24, in a case where the both eyes of the observer are located at the centers of each of the observing regions, the observer does not recognize 3D moiré. However, in a case where the both eyes of the observer are located in the vicinity of the borders (e.g., positions T, S) of each of the observing regions, the observer recognizes the radical luminance change and thereby perceives 3D moiré.

Note that the 3D moiré is called herein as black moiré when the image luminance is radically decreased. Inversely, it is called herein as white moiré when the image luminance is increased. FIG. 24 is a case where black moiré is generated.

When the ideal pixel shape shown in the related techniques is applied to the actual display panel, 3D moiré is to be visually recognized due to a steep luminance difference generated according to shift in the observing position caused by variation in the processing precision. As a countermeasure for that, it is considered to achieve an ideal shape by adding a correction pattern to the acute angle part, for example. However, in that case, even when the correction pattern is added, the processing precision variation cannot be absorbed sufficiently. Not only that, there still remains such an issue that the correction pattern itself cannot be disposed when high definition is advanced or that the correction pattern cannot function.

As a countermeasure for 3D moiré, considered is a method with which the luminance increase/decrease is eased by employing defocus of a lens. When employing defocusing, the distance from the lens vertex to the sub-pixel (referred to as "lens-pixel distance" hereinafter) is changed with respect to the focal distance of the lens to "blur" the steep luminance difference for improving the 3D moiré. However, this means to shift the focal distance intentionally, so that the stereoscopic display property typically 3D crosstalk is worsened.

Further, when using defocusing, it is important to keep the lens-pixel distance constant with high precision. When variation in the lens-pixel distance is large, defocusing is worsened further so that the 3D crosstalk property is deteriorated greatly. The 3D crosstalk herein means a phenomenon where a certain viewpoint image is mixed into another viewpoint image and displayed when performing stereoscopic display. In order to keep the lens-pixel distance constant with high precision, high processing precision is required not only for the lens manufacturing technique but also for the display panel manufacturing technique.

In a display panel where sub-pixels of narrow pitch are disposed in matrix for achieving higher definition, variation in the processing precision becomes relatively larger. Thereby, the change in the longitudinal aperture width becomes still greater. Further, the number of the sub-pixels in the display region of the display panel having a large number of pixels becomes relatively greater, so that it is necessary to keep the processing precision over a wide range of the display panel.

It is therefore an exemplary object of the present invention to provide a naked-eye type stereoscopic display device which can achieve a fine stereoscopic display property while achieving high-definition display and high yield.

SUMMARY OF THE INVENTION

The stereoscopic display device according to an exemplary aspect of the invention is a stereoscopic display device which includes: a display panel including sub-pixels with optical aperture parts being disposed in a matrix form in a first direction and a second direction that is roughly perpendicular to the first direction; and a light-ray control module which is provided by opposing to the display panel for controlling light rays towards the first direction, wherein: each of the aperture parts of two of the sub-pixels neighboring to each other in the first direction includes an overlapping region overlapping with each other in the second direction and a non-overlapping region not overlapping with each other; provided that a light amount emitted from a linear aperture of the aperture part in parallel to the second direction is defined as a longitudinal light amount, the non-overlapping region includes a longitudinal light amount fluctuating region where the longitudinal light amount changes continuously from roughly a center of the aperture part towards both ends of the first direction, respectively; and a sum of the longitudinal light amounts of the two overlapping regions overlapping with each other located at a same position in the first direction is larger than the longitudinal light amount in roughly the center of the aperture part.

As an exemplary advantage according to the invention, the present invention can achieve a fine stereoscopic display property even with a naked-eye type stereoscopic display device which employs a display panel with narrow-pitch sub-pixels or a display panel with a large number of pixels.

BRIEF DESCRIPTION OF THE DRAWINGS

FIG. 3A is a fragmentary elevational view showing the structure of Example 1 of the first exemplary embodiment, FIG. 3B is a graph showing the relation between positions in the first direction and longitudinal light amounts in Example 1 of the first exemplary embodiment, and FIG. 3C is a graph showing the relation between positions in the first direction and slit angles in Example 1 of the first exemplary embodiment;

FIG. 5A is an explanatory chart showing the relation between slit angles and rotation angles of liquid crystal molecules in a case of negative liquid crystals, and FIG. 5B is a graph showing the relation between applied voltages of each slit angle and transmittance in a case of the negative liquid crystals;

FIG. 6A is a fragmentary elevational view showing the structure of Example 2 of the first exemplary embodiment, FIG. 6B is a graph showing the relation between positions in the first direction and longitudinal light amounts in Example 2 of the first exemplary embodiment, and FIG. 6C is a graph showing the relation between positions in the first direction and slit angles in Example 2 of the first exemplary embodiment;

FIG. 7A is a fragmentary elevational view showing the structure of Example 3 of the first exemplary embodiment, FIG. 7B is a graph showing the relation between positions in the first direction and longitudinal light amounts in Example 3 of the first exemplary embodiment, and FIG. 7C is a graph showing the relation between positions in the first direction and slit angles in Example 3 of the first exemplary embodiment;

FIG. 8A is a fragmentary elevational view showing a case where corners of the aperture parts of Example 1 of the first exemplary embodiment are rounded, and FIG. 8B is a graph showing the relation between positions in the first direction and longitudinal light amount in the case shown in FIG. 8A;

FIG. 14A is a fragmentary elevational view showing the structure of Example 1 of a third exemplary embodiment, FIG. 14B is a graph showing the relation between positions in the first direction and longitudinal light amounts in Example 1 of the third exemplary embodiment, and FIG. 14C is a graph showing the relation between positions in the first direction and slit angles in Example 1 of the third exemplary embodiment;

FIG. 15A is a fragmentary elevational view showing the structure of Example 2 of the third exemplary embodiment, FIG. 15B is a graph showing the relation between positions in the first direction and longitudinal light amount in Example 2 of the third exemplary embodiment, and FIG. 15C is a graph showing the relation between positions in the first direction and slit angles in Example 2 of the third exemplary embodiment;

FIG. 16A is a fragmentary elevational view showing the structure of Example 1 of a fourth exemplary embodiment, FIG. 16B is a graph showing the relation between positions in the first direction and longitudinal light amounts in Example 1 of the fourth exemplary embodiment, and FIG. 16C is a graph showing the relation between positions in the first direction and slit angles in Example 1 of the fourth exemplary embodiment;

FIG. 17A is a fragmentary elevational view showing the structure of Example 2 of the fourth exemplary embodiment, FIG. 17B is a graph showing the relation between positions in the first direction and longitudinal light amounts in Example 2 of the fourth exemplary embodiment, and FIG. 17C is a graph showing the relation between positions in the first direction and slit angles in Example 2 of the fourth exemplary embodiment;

FIG. 18A is a fragmentary elevational view showing the structure of Comparative Example of a fifth exemplary embodiment, FIG. 18B is a first graph showing the relation between positions in a second direction and luminance in Comparative Example of the fifth exemplary embodiment, and FIG. 18C is a second graph showing the relation between positions in the second direction and luminance in Comparative Example of the fifth exemplary embodiment;

FIG. 19A is a fragmentary elevational view showing the structure of Example 1 of the fifth exemplary embodiment, FIG. 19B is a first graph showing the relation between positions in the second direction and luminance in Example 1 of the fifth exemplary embodiment, and FIG. 19C is a second graph showing the relation between positions in the second direction and luminance in Example 1 of the fifth exemplary embodiment;

FIG. 20A is a fragmentary elevational view showing the structure of Example 2 of the fifth exemplary embodiment, FIG. 20B is a first graph showing the relation between positions in the second direction and luminance in Example 2 of the fifth exemplary embodiment, and FIG. 20C is a second graph showing the relation between positions in the second direction and luminance in Example 2 of the fifth exemplary embodiment;

FIG. 21A is a fragmentary elevational view showing the structure of a related technique, and FIG. 21B is a graph showing the relation between positions in the first direction and longitudinal aperture widths according to the related technique;

FIG. 25A is a fragmentary elevational view showing the structure of a sixth exemplary embodiment, and FIG. 25B is a graph showing the relation between positions in the first direction and longitudinal light amounts in the sixth exemplary embodiment,

DETAILED DESCRIPTION OF THE PREFERRED EMBODIMENTS

Figure 1:
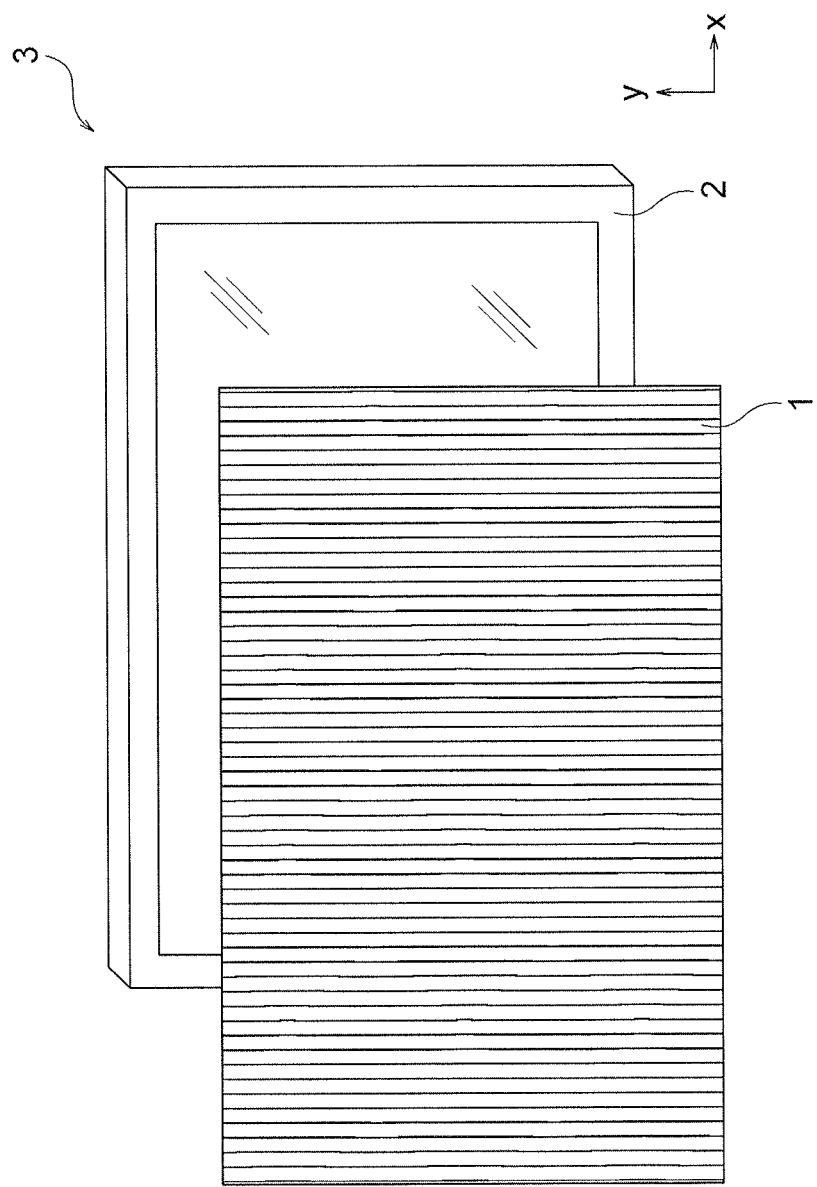
FIG. 1 is a detailed perspective view showing a stereoscopic display device in each Example of a first exemplary embodiment.

Hereinafter, modes (referred to as "exemplary embodiments" hereinafter) for embodying the present invention will be described by referring to the accompanying drawings. Note that same reference numerals are used for substantially the same structural elements in current Specification and the Drawings. Hatching in the drawings does not mean a cut section but is applied for allowing those skilled in the art to comprehend easily.

First Exemplary Embodiment (Overall Structures)

The overall structures of a stereoscopic display device that is in common to each exemplary embodiment and each Example according to the present invention will be described by referring to FIG. 1 and FIG. 2. As shown in FIG. 1, a stereoscopic display device 3 includes: a display panel 2 which is provided with sub-pixels (to be described later) including optical apertures, which are disposed in matrix along a first direction x and a second direction y that is roughly perpendicular to the first direction x; and a lens 1 which is disposed by opposing to the display panel 2 and functions as a light-ray control module for controlling light rays towards the first direction x. The lens 1 is disposed on the observer side of the display panel 2. The lens 1 and the display panel 2 are illustrated by being separated from each other in FIG. 1 to be easily comprehended. In practice, however, the lens 1 and the display panel 2 are used by being in contact with each other as shown in FIG. 2.

The stereoscopic display device 3 may be of any types as long as it includes the display panel 2 on which the sub-pixels (to be described later) of the present invention are arranged in matrix. The display panel 2 may be a plasma display device or an organic EL display as a self-luminous type display device or a non-self-luminous type liquid crystal display, for example. Further, as the lens 1 as the light-ray control module, a lenticular lens, a GRIN lens, a fly-eye lens, or the like can be employed.

Figure 2:
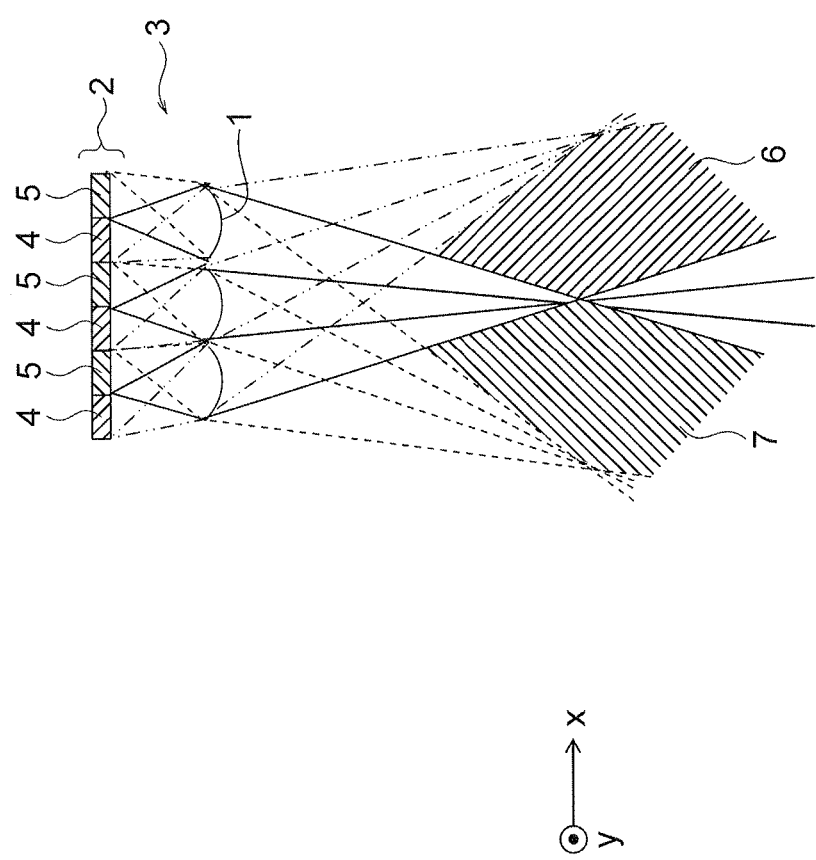
FIG. 2 is a fragmentary plan view of the stereoscopic display device shown in FIG. 1 viewed from the above.

FIG. 2 is a plan view of a part of the stereoscopic display device 3 shown in FIG. 1 viewed from the above. First-viewpoint sub-pixels 4 and second-viewpoint sub-pixels 5 are arranged in matrix on the display panel 2, and unit lenses of the lens 1 are disposed by corresponding to the sub-pixel pairs. On the observing plane side, a first viewpoint image view field 6 and a second viewpoint image view field 7 are formed. It is not essential for the light-ray control module to be the lens 1 as long as view fields of each viewpoint can be formed on the observing plane side. It is possible to employ a parallax barrier or a type with which the emission light itself has the directivity. While FIG. 2 shows the 2-viewpoint stereoscopic display device 3, the present invention can be applied to a multi-viewpoint type or an IP (integral photography) type stereoscopic display device through changing the pitch of the sub-pixels and the light-ray control modules, for example.

First Exemplary Embodiment (Example 1)

Example 1 of the first exemplary embodiment will be described by referring to FIG. 3A. Sub-pixels 110, 120, and 130 of Example 1 are arranged along the first direction x. The unit lenses of the lens 1 as the light-ray control modules are disposed at the positions corresponding to a pair of sub-pixels 110, 130, and arranged repeatedly along the first direction x. Because of such structure, the first direction x is roughly in parallel to the observer viewpoint direction that is the light-separating direction.

While the sub-pixel 110 will be focused and described hereinafter, the explanation also applies to the neighboring sub-pixels 120 and 130. In other exemplary embodiments and Examples, the sub-pixel in the center among the illustrated three sub-pixels will be focused and described as well.

First, the outline of Example 1 will be described. The three sub-pixels 110, 120, and 130 neighboring to each other in the first direction x include respective aperture parts 111, 121, and 131. The aperture part 111 includes overlapping regions 116L, 116R overlapping with the aperture part 121 or the aperture part 131 in the second direction y and a non-overlapping region 117 not overlapping thereto. Provided that the light amount emitted from a linear aperture of the aperture part 111 in parallel to the second direction y is defined as "longitudinal aperture amount", the non-overlapping region 117 includes longitudinal light amount fluctuating regions 118L and 118R where the longitudinal light amount changes continuously from roughly the center of the aperture part 111 towards both ends of the first direction x, respectively. Further, the sum of longitudinal light amounts 146L, 156R of the two overlapping regions 116L, 126R overlapping with each other at the same position in the first direction x is larger than a longitudinal light amount 149 roughly in the center of the aperture part 111.

Further, the sum of the longitudinal light amounts 146L, 156R of the two overlapping regions 116L, 126R overlapping with each other at the same position in the first direction x may be defined to be the same at any positions in the first direction x.

While a liquid crystal display is used in Example 1 as described in the followings, the display panel 2 (FIG. 1 and FIG. 2) may also be an organic EL display or a plasma display as long as the sub-pixels 110, 120, and 130 described above are provided. The sub-pixel 110 is an FFS (Fringe Field Switching) mode liquid crystal display device, which includes a plurality of 6 striped electrodes 101 and slits 102 in the periphery of the electrodes 101 within the aperture part 111. The angle between the long-side direction of the slit 102 and the liquid crystal initial alignment (first direction x) is $\psi 1$ in the overlapping regions 116L, 116R, and changes from $\psi 1$ to $\psi 2$ in the longitudinal light amount fluctuating regions 118L, 118R. Further, the relation of the angles satisfies $\psi 1 \neq \psi 2$.

Hereinafter, Example 1 will be described in more details by referring to FIG. 3A to FIG. 5B.

FIG. 3A shows the three sub-pixels 110, 120, and 130 arranged in parallel to the first direction among a great number of sub-pixels arranged in matrix. The sub-pixel 110 is of an FFS liquid crystal driving type, so that it includes an electrode on the lower side (not shown) and the electrode 101 on the upper side. The slits 102 are disposed in the periphery of the electrodes 101. The angle $\psi$ ($-90° < \psi \leq 90°$) in the long-side direction of the slit 102 with respect to the first direction x is constituted with $\psi 1$ and $\psi 2$, so that there are two liquid crystal domains within the aperture part 111. In FIG. 3A, the angles are set as $\psi 1 = 0°$ and $\psi 2 = -30°$ as a way of example.

Regarding the angle $\psi$, the angle of the first direction x is defined as 0°, the counterclockwise direction is defined as + direction, and the clockwise direction is defined as − direction. By defining the angles in that manner, the angles in the long-side direction of all the slits 102 can be regulated within a range of $-90° < \psi \leq 90°$.

In FIG. 3A, the shape of the aperture part 111 overlaps, in the second direction y, with the aperture parts 121 and 131 neighboring to each other in the first direction x. The overlapping sections along the first direction x are referred to as overlapping sections 112L and 112R. Further, the optical aperture shapes within the overlapping sections 112L and 112R are referred to as overlapping regions 116L and 116R. In the meantime, there is a section which does not overlap with the neighboring aperture parts 121 and 131 in the second direction y existing within the aperture part 111. The non-overlapping section is referred to as a non-overlapping section 113, and the optical aperture shape in the non-overlapping section 113 is referred to as a non-overlapping region 117.

The non-overlapping region 117 can further be described as follows. In roughly the center of the aperture part 111, there is a section where the longitudinal light amount that is the light amount emitted from the linear aperture that is in parallel to the second direction y is constant regardless of the positions in the first direction x. This section is referred to as a longitudinal light amount constant section 115, and the optical aperture shape in the longitudinal light amount constant section 115 is referred to as a longitudinal light amount constant region 119. Further, on both side of the longitudinal light amount constant section 115 within the non-overlapping region 117, there are longitudinal light amount fluctuating sections 114L and 114R where the longitudinal light amount changes depending on the positions in the first direction x. The regions defined by the longitudinal light amount fluctuating section 114L and 114R are referred to as longitudinal light amount fluctuating regions 118L and 118R.

The relation between the positions in the first direction x and changes in the longitudinal light amount is shown in FIG. 3B by a plot 3b. The longitudinal light amount in the overlapping section 112L is the sum of the longitudinal light amount 146L of the aperture part 111 and the longitudinal light amount 156R of the aperture part 121. As can be seen from the plot 3b, the longitudinal light amount becomes the maximum value Wh in the overlapping sections 112L, 112R, continuously changes in the longitudinal light amount fluctuating sections 114L, 114R, and becomes the minimum value Wl in the longitudinal light amount constant section 115.

The relation between the positions in the first direction x and the angles of the slit 102 is shown in FIG. 3C by a plot 3c. The angles of a plurality of slits 102 neighboring to a plurality of electrodes 101 within the aperture part 111 are all ψ1 in the overlapping sections 112L, 112R and all ψ2 in the longitudinal light amount constant section 115. The angles of a plurality of slits 102 in the longitudinal light amount fluctuating sections 114L, 114R are bent from ψ1 to ψ2, and the bent positions in the first direction x vary for each slit.

Figure 4A:
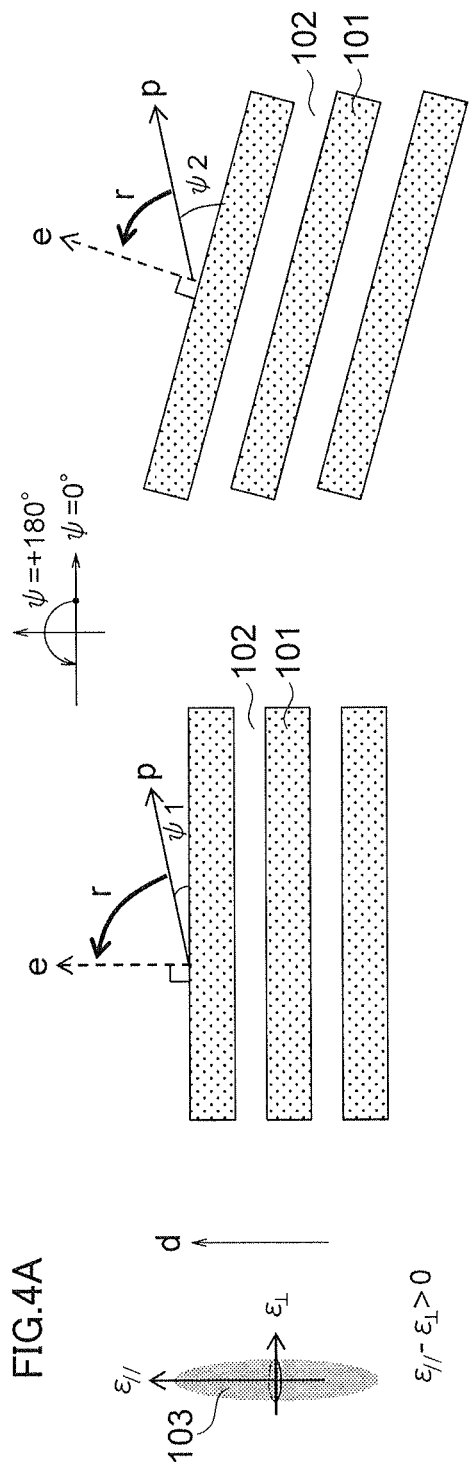
FIG. 4A is an explanatory chart showing the relation between slit angles and rotation angles of liquid crystal molecules in a case of positive liquid crystals.

The relation between the angles of the slits 102 and the longitudinal light amount will be described by referring to FIG. 4A and FIG. 4B from the viewpoint of applied voltages V and transmittance T in the FFS mode. The FFS mode is a driving mode with which a fringe electric field is generated by potential differences from the electrode 101 on the upper layer through the slit 102 to the electrode (not shown) on the lower layer, and liquid crystal molecules 103 are rotated by the fringe electric field. FIG. 4A shows the angle ψ(0°≤ψ<180°) formed between the initial alignment direction p of positive liquid crystal (ε//−ε⊥>0) with respect to the long-side direction of the slit 102 in a case of ψ=ψ1, ψ2. Note here that ε// is a dielectric constant of the director direction d, and ε⊥ is a dielectric constant of the direction that is orthogonal to the director direction d. The initial alignment direction p can be defined by the rubbing direction and the polarization light irradiating direction in the photo-alignment. The fringe electric field is generated in the direction (electric field direction e) substantially perpendicular to the long-side direction of the slits 102, so that the liquid crystal molecules 103 rotate counterclockwise from the initial alignment direction p. Therefore, as shown in the drawings, the rotation angle r becomes smaller in the case of ψ2 than the case of ψ1.

Regarding the angle ψ, the angle of the long-side direction of the slit 102 is defined as 0°, the counterclockwise direction is defined as the + direction, and the clockwise direction is defined as the − direction. By defining the angles in that manner, the angles ψ in the initial alignment direction p of all the liquid crystal molecules 103 can be regulated within a range of 0°<ψ≤180°.

Figure 4B:
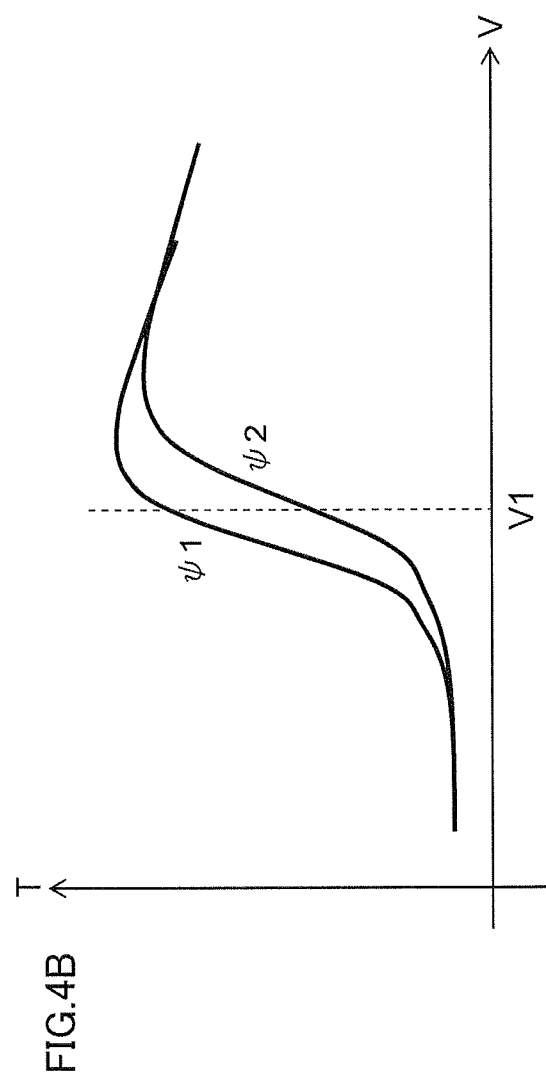
FIG. 4B is a graph showing the relation between applied voltages of each slit angle and transmittance in a case of the positive liquid crystals.

The relation between the applied voltage and the transmittance is schematically shown in FIG. 4B. Comparing the transmittance at the voltage V1, the transmittance in the case of ψ1 is larger than the transmittance in the case of ψ2. This is due to a difference in the rotation angle r of the liquid crystal molecules 103. Therefore, even when the aperture areas are the same, the light amount emitted from the entire aperture part 111 varies for the case of ψ1 and the case of ψ2.

FIG. 5A shows the angle formed between the initial alignment direction n and the long-side direction of the slits 102 in a case of negative liquid crystal (ε//−ε⊥<0). The initial alignment direction n of negative liquid crystal is set to be +90° direction of the initial alignment direction p of the positive liquid crystal. The liquid crystal molecules 103 rotate counterclockwise from the initial alignment direction n, and the rotation angle r becomes smaller in the case of ψ12 than the case of ψ11. Therefore, as shown in FIG. 5B as in the case of the positive liquid crystal, the light amount emitted from the entire aperture part 111 varies for the case of ψ11 and the case of ψ12 even when the aperture areas are the same due to the relation between the liquid crystal applied voltage V and the transmittance T.

From the results of FIG. 4A to FIG. 5A, it can be seen that the V-T property becomes different when the angle ψ of the slits 102 changes. Therefore, through setting the initial alignment directions p and n of the liquid crystal molecules 103 properly, it becomes possible to set respective longitudinal light amounts of the overlapping regions 116L, 116R and the longitudinal light amount constant region 119 as shown in FIG. 3B. Further, since the positions at which the angles ψ of the slits 102 are bent vary for each slit 102 in the first direction x in the longitudinal light amount fluctuating regions 118L and 118R, the longitudinal light amount can be changed continuously as shown in FIG. 3B.

While FIG. 3A shows the relation of ψ1>ψ2, it is not essential to satisfy this relation. It is because the relation of "(longitudinal light amount 146L+longitudinal light amount 156R)>longitudinal light amount 148L>longitudinal light amount 149" simply needs to be satisfied, and the relation in terms of the values of the longitudinal light amount can be controlled through controlling the alignment directions of the liquid crystal molecules 103.

Further, while the sum of the longitudinal light amount 146L and the longitudinal light amount 156R in the overlapping region 116L in FIG. 3B is constant regardless of the positions in the first direction x, it is not limited to be constant. As long as the relation of "(longitudinal light amount 146L+longitudinal light amount 156R)>longitudinal light amount 148L>longitudinal light amount 149" is satisfied, it is not essential for the sum to be constant.

First Exemplary Embodiment (Example 2)

Example 2 of the first exemplary embodiment will be described by referring to FIG. 6A. A sub-pixel 210 includes an aperture part 211. The aperture part 211 is divided into overlapping sections 212L, 212R and a non-overlapping section 213. The non-overlapping section 213 is divided into longitudinal light amount fluctuating sections 214L, 214R and a longitudinal light amount constant section 215. The overlapping sections 212L, 212R correspond to overlapping regions 216L, 216R, the non-overlapping section 213 corresponds to a non-overlapping region 217, the longitudinal light amount fluctuating sections 214L, 214R correspond to longitudinal light amount fluctuating regions 218L, 218R, and the longitudinal light amount constant section 215 corresponds to a longitudinal light amount constant region 219, respectively. A longitudinal light amount 246L corresponds to the overlapping region 216L, a longitudinal light amount 248L corresponds to the longitudinal light amount fluctuating region 218L, and a longitudinal light amount 249 corresponds to the longitudinal light amount constant region 219, respectively. Sub-pixels 220 and 230 are also in the same structure as that of the sub-pixel 210. For example, the sub-pixels 220, 230 include respective aperture parts 221, 231, and an overlapping section 222R corresponds to an overlapping region 226R and a longitudinal light amount 256R.

As in the case of Example 1, the overlapping region 216L is formed only with the electrode 101 in which the angles of the slits 102 are ψ1, while the longitudinal light amount constant region 219 is formed only with the electrode 101 in which the angles of the slits 102 are ψ2. In the meantime in the longitudinal light amount fluctuating regions 218L, 218R, the angles of all of a plurality of slits 102 change gradually from ψ2 to ψ1 as the position in the first direction x approaches the overlapping sections 212L, 212R from the longitudinal light amount constant section 215 unlike the case of Example 1. It is the feature of Example 2 that the changes in the angles of all the slits 102 are the same with respect to the positions in the first direction x and the changes thereof are gradual.

Other structures of Example 2 are the same as those of Example 1 of the first exemplary embodiment as shown in FIG. 6A. Operations and effects of Example 2 are also the same as those of Example 1 of the first exemplary embodiment as shown by a plot 6b in FIG. 6B and a plot 6c in FIG. 6C.

First Exemplary Embodiment (Example 3)

Example 3 of the first exemplary embodiment will be described by referring to FIG. 7A. A sub-pixel 310 includes an aperture part 311. The aperture part 311 is divided into overlapping sections 312L, 312R and a non-overlapping section 313. The non-overlapping section 313 is divided into longitudinal light amount fluctuating sections 314L and 314R. The overlapping sections 312L, 312R correspond to overlapping regions 316L, 316R, the non-overlapping section 313 corresponds to a non-overlapping region 317, and the longitudinal light amount fluctuating sections 314L, 314R correspond to longitudinal light amount fluctuating regions 318L, 318R, respectively. A longitudinal light amount 346L corresponds to the overlapping region 316L, and a longitudinal light amount 348L corresponds to the longitudinal light amount fluctuating region 318L, respectively. Sub-pixels 320 and 330 are also in the same structure as that of the sub-pixel 310. For example, the sub-pixels 320, 330 include respective aperture parts 321, 331, and an overlapping section 322R corresponds to an overlapping region 326R and a longitudinal light amount 356R.

The difference of Example 3 with respect to Examples 1 and 2 is that there is no longitudinal light amount constant region. That is, in Example 3, the angles of the slits 102 within the non-overlapping region 317 of the aperture part 311 continuously change at all times with respect to the positions in the first direction x. Further, roughly in the center of the aperture part 311, the angle of the slit 102 is ψ2 and the longitudinal light amount 349 becomes the minimum value Wl. The longitudinal light amount in the longitudinal light amount fluctuating regions 318L, 318R continuously increases from the minimum value Wl towards the overlapping regions 316L, 316R.

Other structures of Example 3 are the same as those of Example 1 of the first exemplary embodiment as shown in FIG. 7A. Operations and effects of Example 3 are also the same as those of Example 1 of the first exemplary embodiment as shown by a plot 7b in FIG. 7B and a plot 7c in FIG. 7C.

First Exemplary Embodiment (Operations and Effects)

Above-described Examples 1 to 3 of the first exemplary embodiment show the ideal sub-pixel structures. A case where corners of the aperture part of the sub-pixel are rounded in Example 1 will be described by referring to FIG. 8A. FIG. 8A shows aperture parts 111a, 121a of sub-pixels 110a, 120a which are deformed due to generation of rounded corners P, Q, an overlapping section 112aL of the aperture part 111a, a longitudinal light amount fluctuating section 114aL, an overlapping region 116aL, an overlapping section 122aR of the aperture part 121a, a longitudinal light amount fluctuating section 124aR, an overlapping region 126aR, and the like.

Changes in the longitudinal light amount with respect to the positions in the first direction x (changes in the sum of the longitudinal light amount in the overlapping sections 112aL and 122aR) are shown by a plot 8b of FIG. 8B. Compared to the case of the ideal sub-pixels, the overlapping sections 112aL, 122aR are reduced due to the rounded corners P, Q. Further, at the positions S, T where the rounded corners P, Q are generated, the longitudinal light amount becomes decreased. Specifically, it behaves as in a profile in which the longitudinal light amount drops by the longitudinal amount change value Wq in the longitudinal light amount change section Vq in the vicinity of the overlapping region 116aL along the first direction x, and increases again.

The longitudinal light amount change value Wq is a smaller value than Wh−Wl that is the difference between the maximum value Wh as the sum of the longitudinal light amount in the overlapping section 112aL, 122aR and the minimum value Wl as the longitudinal light amount in the longitudinal light amount constant section. The phenomenon shown in FIG. 8B is also found in the case where rounded corners are generated in the aperture parts in Examples 2 and 3.

As shown in FIG. 3A, the longitudinal light amount 149 (minimum value Wl) in the longitudinal light amount constant section 115 located at roughly the center of the aperture part 111 is smaller than the longitudinal light amount (sum of the longitudinal light amounts in the overlapping sections 112L and 122R) in the other sections. Looking at that from the viewpoint of the stereopsis regions (stereopsis regions 6 and 7) projected to the observing plane shown in FIG. 2 and the positional relation between the lens 1 and the sub-pixel 110 shown in FIG. 3A, the image luminance projected to roughly the center of the stereopsis region is dominated by the longitudinal light amount 149 (minimum value Wl) corresponding to the longitudinal light amount constant section 115. Thus, the longitudinal light amount 149 (minimum value Wl) is always lower than the image luminance at other observing angles. Therefore, when the observing positions is shifted from the normal stereopsis observing position, the longitudinal light amount larger than the longitudinal light amount 149 (minimum value Wl) becomes dominant, so that white moiré is to be generated at all times.

As described above when "(longitudinal light amount 146L+longitudinal light amount 156R)>longitudinal light amount 148L>longitudinal light amount 149" is satisfied in that case, white moiré can be generated at all times. Thus, it is not essential for the sum of the longitudinal light amounts 146L and 156R in the overlapping sections 112L and 122R to be constant.

Figure 9:
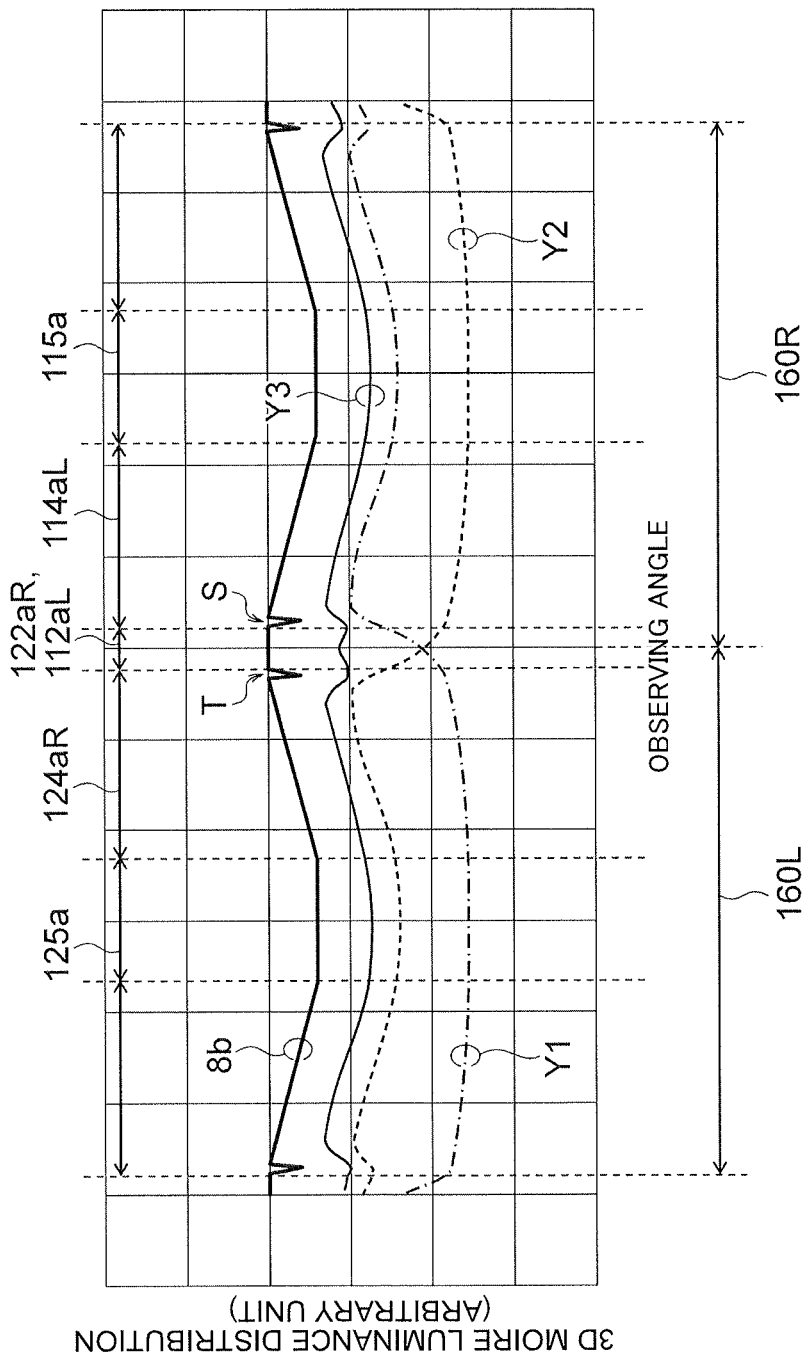
FIG. 9 is a graph showing 3D moiré recognized by an observer in a case where the corners of the aperture part of Example 1 of the first exemplary embodiment are rounded.

More specific explanations are as follows. An image of 3D moiré in the state of FIG. 8B is shown in FIG. 9. FIG. 9 shows the overlapping sections 112aL, 122aR, the longitudinal light amount fluctuating sections 114aL, 124aR, the longitudinal light amount constant sections 115a, 125a, and the like. The lateral axis of FIG. 9 shows the observing angles with respect to the first direction x, and the longitudinal axis shows the luminance distribution for the observing angles. Dotted lines show the luminance distributions when an image is outputted to only one of the sub-pixels in a case where the sub-pixel 110 is defined as the right-eye pixel and the sub-pixel 120 is defined as the left-eye pixel. Y1 is the luminance distribution in a case where white is displayed on the right-eye pixel and black is displayed on the left-eye pixel, Y2 is the luminance distribution in a case where black is displayed on the right-eye pixel and white is displayed on the left-eye pixel, and Y3 is the luminance distribution in a case where white is displayed on the both pixels. Basically, the relation regarding the luminance can be expressed as Y3=Y1+Y2. In FIG. 9, the plot 8b (changes in the longitudinal light amount with respect to the positions in the first direction x) shown in FIG. 8B is also shown in a superimposed manner.

Note here that the right-eye observing region is 160R, and the left-eye observing region is 160L. As shown in FIG. 8B, Wh−Wl>Wq described above applies even in a case where both eyes of the observer are located in the vicinity of the borders (e.g., positions S, T) of each of the observing regions. Thereby, black moiré can be suppressed.

Further, the expression "continuously changes" regarding the change in the longitudinal light amount means that a single value of the longitudinal light amount is decided for the position in a given first direction and the value of the longitudinal light amount changes without a break for changes in the positions in the first direction. When the longitudinal light amount changes continuously, the change in the image luminance projected on the observing plane becomes continuous so that a fine stereoscopic display can be achieved. It is more desirable for the longitudinal light amount to change smoothly for the positions of the first direction to be able to differentiate. In a case where the rounding of the corners of the aperture part is small, the range of the longitudinal light amount change section Vq becomes extremely small. Therefore, it is considered that the longitudinal light amount in FIG. 8B also increases continuously from the light amount constant region towards the vicinity of the overlapping region.

Figure 10:
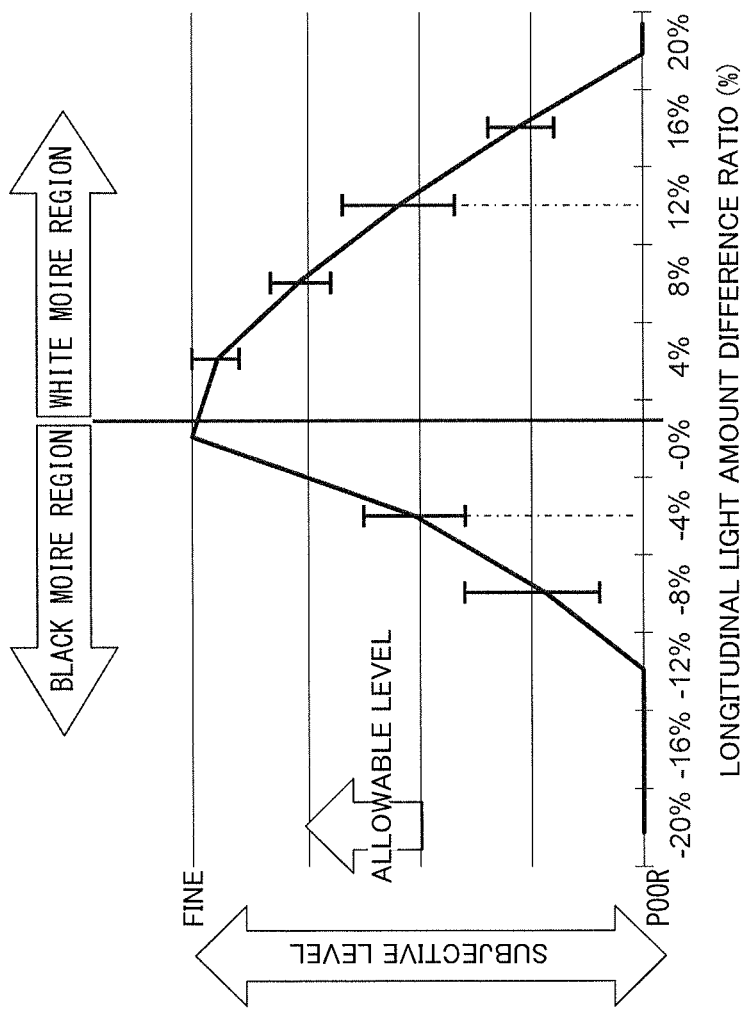
FIG. 10 is a graph showing the subjective evaluation result of 3D moiré.

FIG. 10 shows the results acquired by evaluating the stereoscopic display quality perceived by observers by using typical evaluation images in a case where white moiré was generated and a case where black moiré was generated when observing stereoscopic display. The lateral axis shows the longitudinal light amount difference ratio (Wh−Wl)/Wl, and the longitudinal axis shows the subjective level. The subjective levels were set to be in five levels. Score 5 is the best image quality, score 3 is an allowable image quality, and score 1 is the most unacceptable image quality. The evaluation results show the average of the scores of ten examinees and the standard deviation. The positive region on the lateral axis shows a region where white moiré is generated, and the negative region shows a region where black moiré is generated. According to the evaluation, it is found that the region of the white moiré has the wider region that is subjectively allowable. Further, it is also found that the subjectively allowable range is the range of −4% to 12% as the value of the longitudinal light amount difference ratio. From the evaluation results shown in FIG. 10, (1) and (2) in the followings can be said.

(1) In a case where the value of the longitudinal light amount difference ratio in the range of 12% or less is allowed and black moiré is not allowed, it is desirable for the sum of the longitudinal light amounts in the overlapping regions to fall within a range exceeding 1 time of the longitudinal light amount of the longitudinal light amount constant region and equal to or less than 1.12 times.

(2) In the related techniques, when there is variation in the processing precision generated for the ideal sub-pixel structure, black moiré is generated necessarily. Thus, the subjectively allowable range of the observer is narrow. In the meantime, the first exemplary embodiment is designed to suppress black moiré and intentionally generates white moiré at the same time even when there is variation generated in the processing precision for the ideal sub-pixel structure, so that the allowable range of the observer becomes wide compared to that of the related technique. This makes it possible to achieve a more dominantly fine stereoscopic display property with a naked-eye type stereoscopic display device which employs a display panel having narrow-pitch sub-pixels for achieving high definition and a display panel with a large number of pixels.

Second Exemplary Embodiment

A second exemplary embodiment will be described by referring to FIG. 11A. A sub-pixel 610 includes an aperture part 611. The aperture part 611 is divided into overlapping sections 612L, 612R and a non-overlapping section 613. The non-overlapping section 613 is divided into longitudinal light amount fluctuating sections 614L, 614R and a longitudinal light amount constant section 615. The overlapping sections 612L, 612R correspond to overlapping regions 616L, 616R, the non-overlapping section 613 corresponds to a non-overlapping region 617, the longitudinal light amount fluctuating sections 614L, 614R correspond to longitudinal light amount fluctuating regions 618L, 618R, and the longitudinal light amount constant section 615 corresponds to a longitudinal light amount constant region 619, respectively. A longitudinal light amount 646L corresponds to the overlapping region 616L, a longitudinal light amount 648L corresponds to the longitudinal light amount fluctuating region 618L, and a longitudinal light amount 649 corresponds to the longitudinal light amount constant region 619, respectively. Sub-pixels 620 and 630 are also in the same structure as that of the sub-pixel 610. For example, the sub-pixels 620, 630 include respective aperture parts 621, 631, and an overlapping section 622R corresponds to an overlapping region 626R and a longitudinal light amount 656R.

As in the case of the first exemplary embodiment, there are the overlapping sections 612L, 612R and the non-overlapping section 613 in the second exemplary embodiment. The optical aperture shapes defined by each of the sections are the overlapping regions 616L, 616R and the non-overlapping region 617. The longitudinal light amount constant section 615 and the longitudinal light amount fluctuating sections 614L, 614R exist within the non-verlapping section 613. Further, the longitudinal light amount constant region 619 and the longitudinal light amount fluctuating regions 618L, 618R exist by corresponding to each of the sections.

Figure 11:
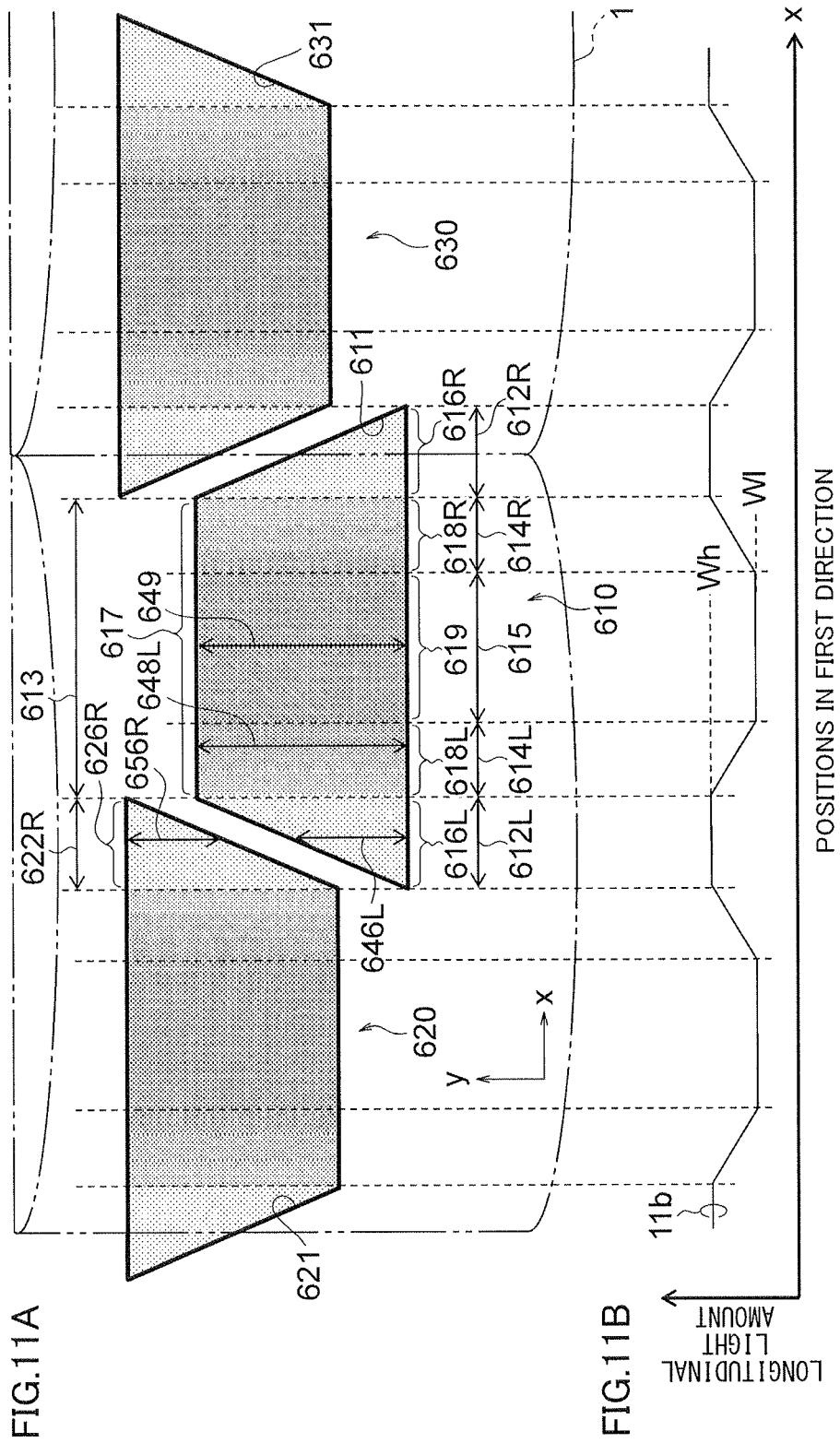
FIG. 11A is a fragmentary elevational view showing the structure of a second exemplary embodiment.
FIG. 11B is a graph showing the relation between positions in the first direction and longitudinal light amounts in the second exemplary embodiment.

The relation between the positions in the first direction x and the longitudinal light amounts is as shown by a plot 11b of FIG. 11B. Such point that the sum of the longitudinal light amounts 646L, 656R of the overlapping sections 612L, 612R becomes the maximum value Wh and that the longitudinal light amount 649 of the longitudinal light amount constant section 615 becomes the minimum value Wl is the same as that of the first exemplary embodiment.

Figure 12:
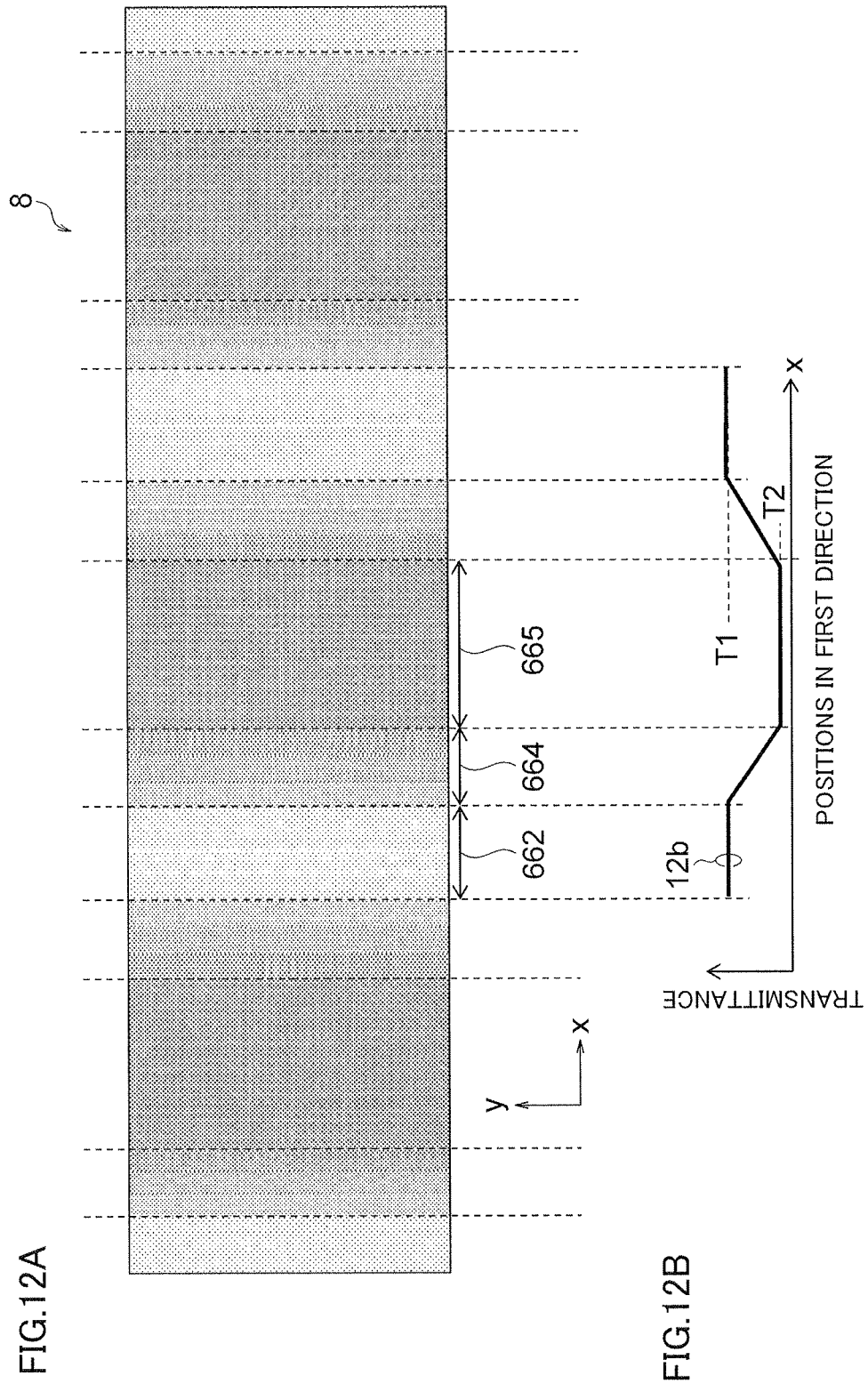
FIG. 12A is a fragmentary elevational view showing a light dimming module of the second exemplary embodiment.
FIG. 12B is a graph showing the relation between positions in the first direction and transmittance of the light dimming module shown in FIG. 12A.

In order to achieve the longitudinal light amounts shown in FIG. 11A and FIG. 11B, a light dimming module, for example, is used. The outline of the light dimming module will be described by referring to FIG. 12A and FIG. 12B. FIG. 12A schematically shows the transmittance distribution of the light dimming module 8. The transmittance changes depending on the positions in the first direction x. Specifically, the transmittance in an optical density constant section 662 is T1, the transmittance in an optical density constant section 665 is T2 (<T1), and the transmittance in an optical density fluctuating section 664 continuously changes from T1 to T2. The optical density constant section 662 corresponds to the overlapping section 612L, the optical density constant section 665 corresponds to the longitudinal light amount constant section 615, and the optical density fluctuating section 664 corresponds to the longitudinal light amount fluctuating section 614L, respectively. The relation between the positions in the first direction x and the transmittance (OD (Optical Density) value) is shown by a plot 12b of FIG. 12B. As the relation between T1 and T2, T1>T2 is satisfied.

With the structures of the second exemplary embodiment described above, the changes in the longitudinal light amount with respect to the positions in the first direction x can be made similar to that of the first exemplary embodiment (FIG. 3B). Further, even when corners are rounded, the longitudinal light amount changes in the manner similar to FIG. 8B. Thus, white moiré can be achieved as in the case of the first exemplary embodiment. Further, in the second exemplary embodiment, the present invention is structured with the light dimming module 8 that is not affected by rounding of the corners. Therefore, an excellent stereoscopic display property can be acquired.

Figure 13:
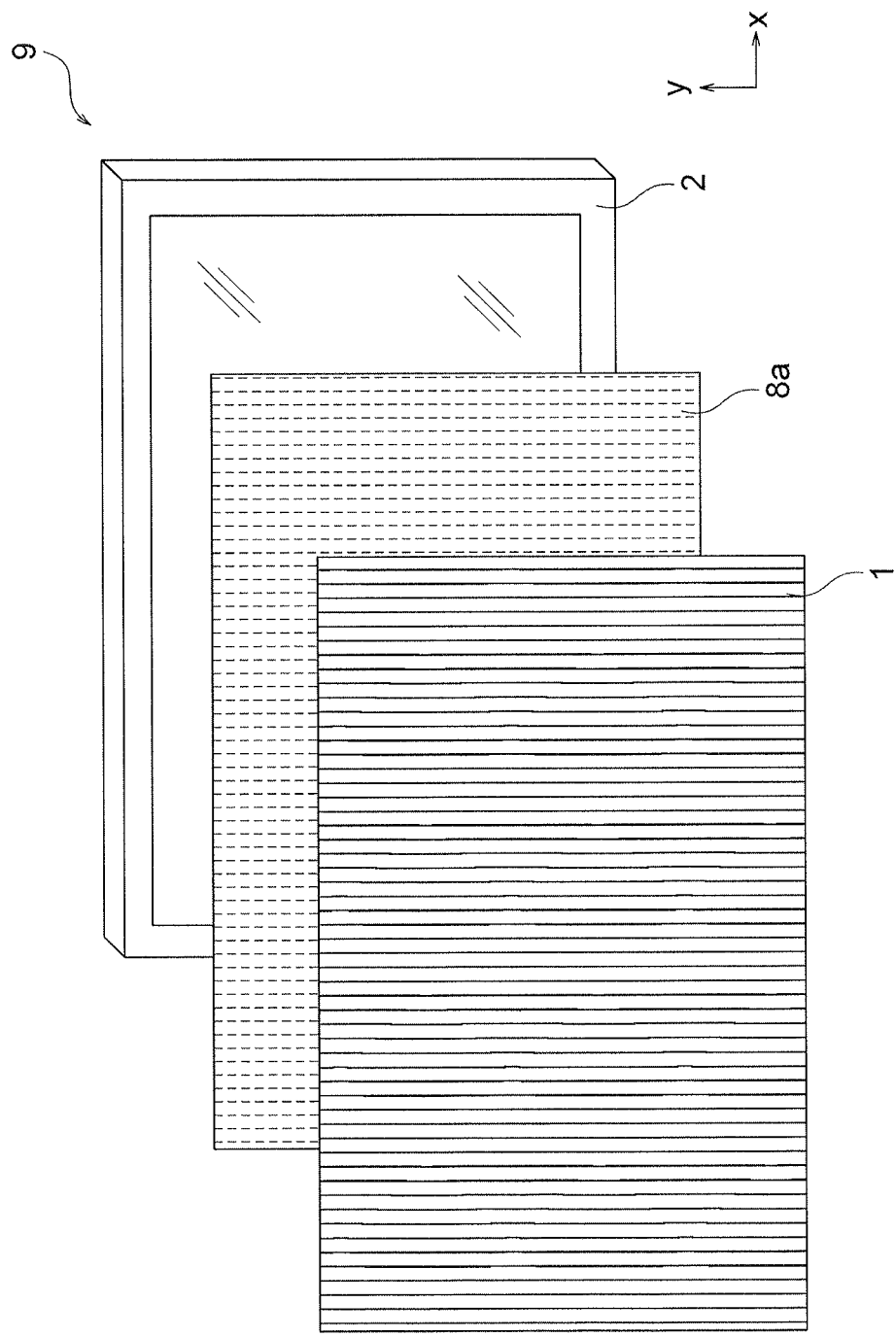
FIG. 13 is a fragmentary elevational view showing an example of a stereoscopic display device according to the second exemplary embodiment.
Figures 22A, 22B:
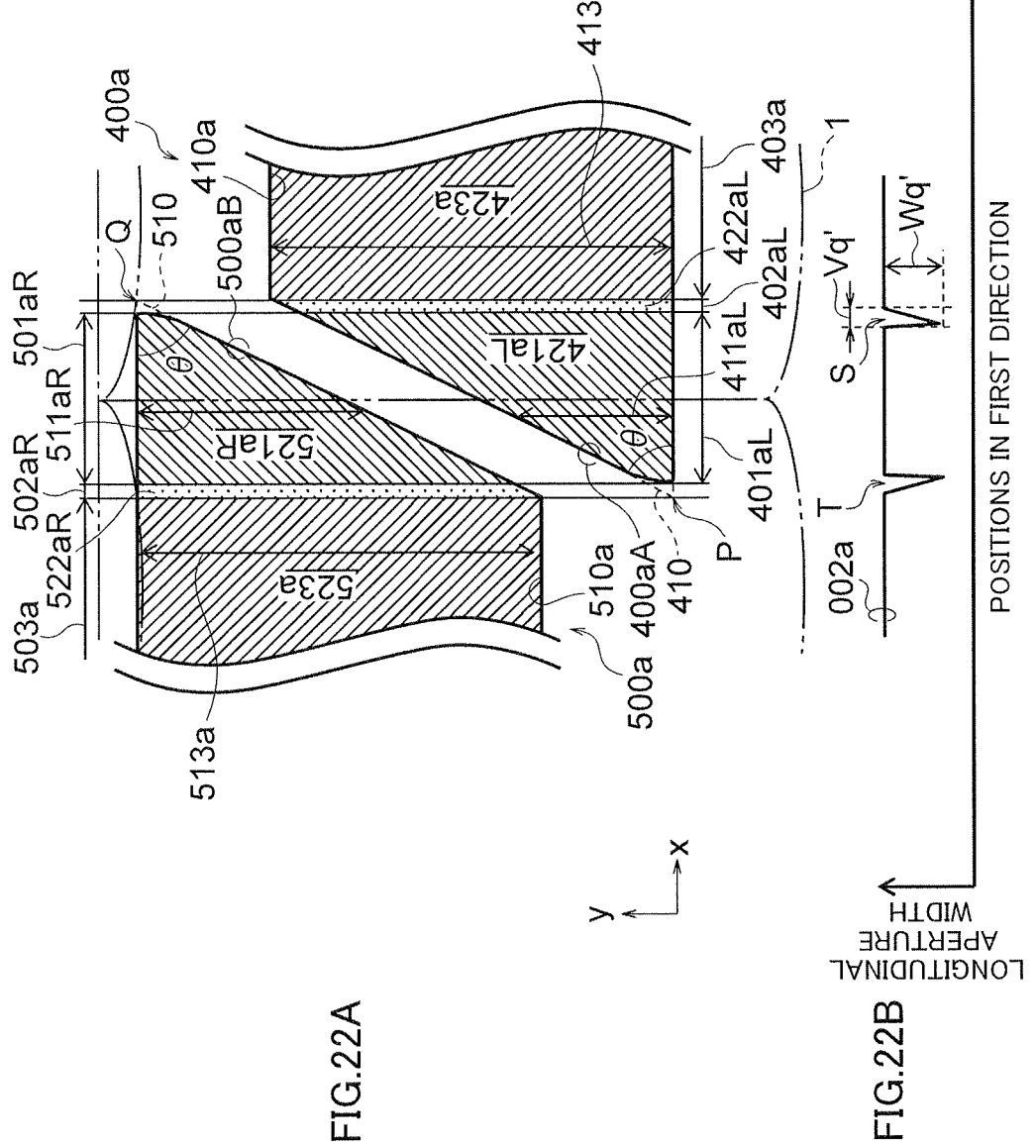
FIG. 22A is a fragmentary elevational view showing a case where corners of the aperture parts in the related technique are rounded.
FIG. 22B is a graph showing the relation between positions in the first direction and longitudinal aperture widths in the case shown in FIG. 22A.
Figure 23:
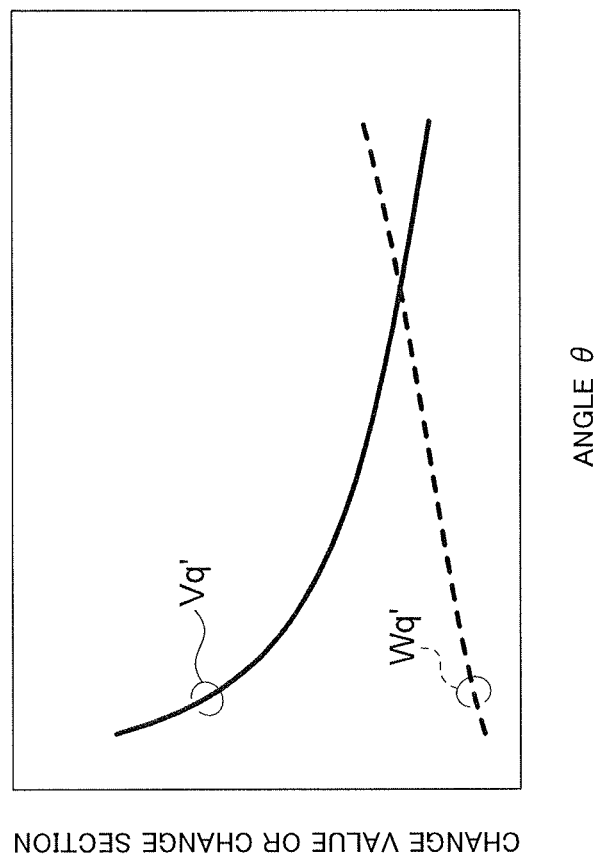
FIG. 23 is a graph showing the relation regarding the angle θ of the corner of an aperture part, a longitudinal aperture width change value Wq', and a longitudinal aperture width change section Vq' in a case where corners of the aperture parts in the related technique are rounded.
Figure 24:
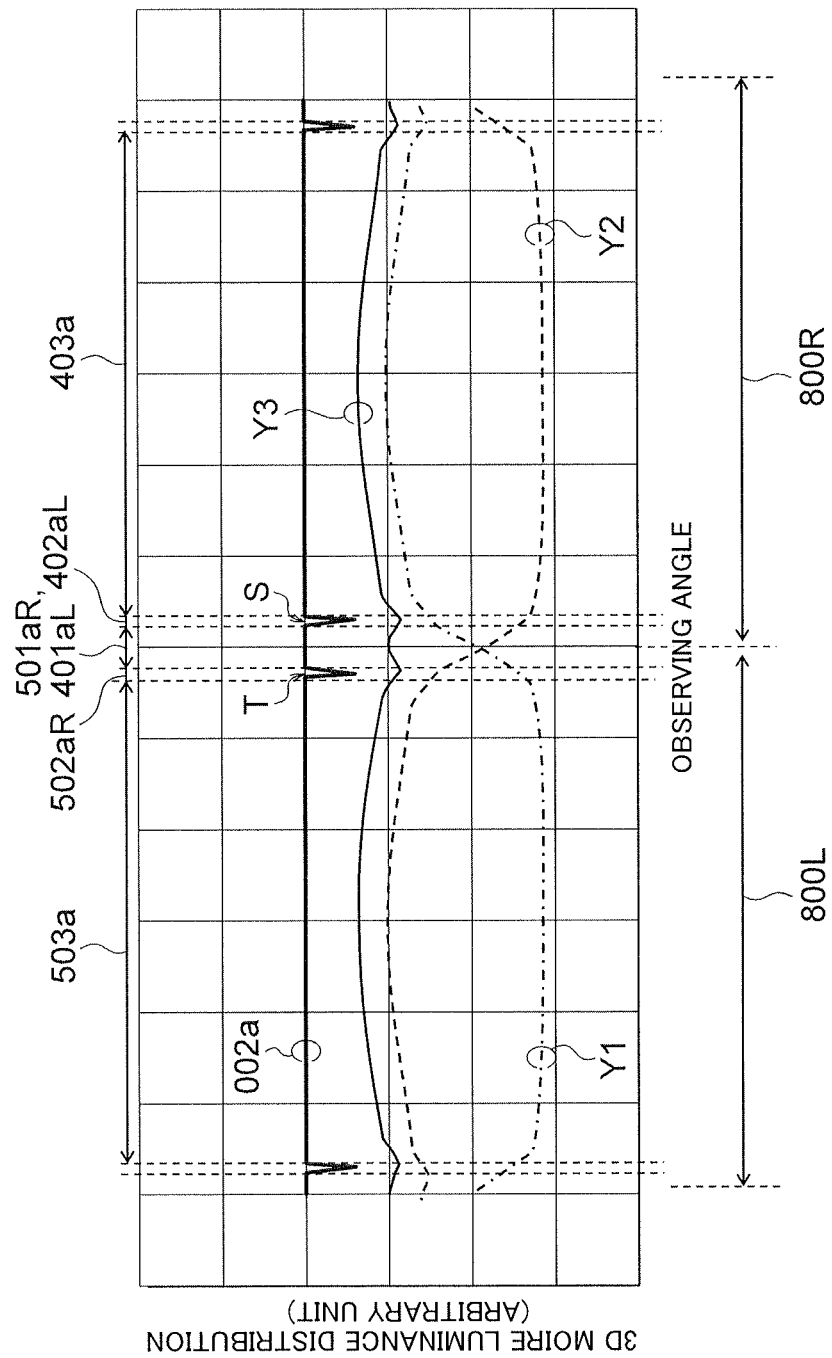
FIG. 24 is a graph showing 3D moiré recognized by the observer in a case where the corners of the aperture parts in the related technique are rounded.

An example of the overall structures of a stereoscopic display device according to the second exemplary embodiment is shown in FIG. 13. The stereoscopic display device 9 employs an ND (Neutral Density) filter 8a as the light dimming module, and it is disposed on a display panel 2 by opposing thereto. The ND filter 8a may be disposed on the observing plane side of the display panel 2 as shown in the drawing. Alternatively, the ND filter 8a may be disposed on the observing plane side of the lens 1 as the light-ray control module or may be disposed on the opposite side of the observing plane, i.e., on the backlight side, in a case where the display panel 2 is a liquid crystal display. Other structures of the stereoscopic display device 9 are the same as those of the stereoscopic display device 1 shown in FIG. 1.

As the light dimming module, it is also possible to employ the structures other than the ND filter. As in the case of the first exemplary embodiment, it is desirable to use the structure that can achieve longitudinal light amount by a unit of pixel. For example, the structures may be a type that has a transmittance distribution in color layers of color filters which constitute LCD or a type that has a transmittance distribution in the lens itself. Further, in a self-luminous device such as an organic EL, a structure in which the emission light intensity has a distribution within a pixel unit (e.g., a film-thickness variable structure in which the film thickness of an organic EL layer is set to be thick in the longitudinal light amount constant section and set to be gradually decreased towards the overlapping section) may be employed. In those cases, the ND filter is unnecessary. Thus, the structure thereof is the same as the overall structures of the stereoscopic display device shown in FIG. 1. Other structures, operations, and effects of the second exemplary embodiment are the same as those of the first exemplary embodiment.

Third Exemplary Embodiment (Example 1)

A third exemplary embodiment is a structure which also changes the longitudinal aperture width in addition to the change in the longitudinal liquid quantity described in the first exemplary embodiment. Unlike the cases of the first and the second exemplary embodiments, the emission light amount is not controlled but the length of the linear aperture in parallel to the second direction is increased or decreased. That is, the longitudinal light amount can also be controlled by controlling the longitudinal aperture width. Note here that the "longitudinal aperture width" is the width of the aperture part in the second direction, which changes depending on the positions in the first direction. In each drawing, the longitudinal aperture widths can be shown with the same arrows as those of the longitudinal light amounts, so that the reference numerals of the longitudinal aperture widths are written in parentheses after the reference numerals of the longitudinal light amounts.

Example 1 of the third exemplary embodiment will be described by referring to FIG. 14A. A sub-pixel 710 includes an aperture part 711. The aperture part 711 is divided into overlapping sections 712L, 712R and a non-overlapping section 713. The non-overlapping section 713 is divided into longitudinal light amount fluctuating sections 714L, 714R and longitudinal light amount constant section 715. The overlapping sections 712L, 712R correspond to overlapping regions 716L, 716R, the non-overlapping section 713 corresponds to a non-overlapping region 717, the longitudinal light amount fluctuating sections 714L, 714R correspond to longitudinal light amount fluctuating regions 718L, 718R, and the longitudinal light amount constant section 715 corresponds to a longitudinal light amount constant region 719, respectively. A longitudinal light amount 746L and a longitudinal aperture width 746Lw correspond to the overlapping region 716L, a longitudinal light amount 748L and a longitudinal aperture width 748Lw correspond to the longitudinal light amount fluctuating region 718L, and a longitudinal light amount 749 and a longitudinal aperture width 749w correspond to the longitudinal light amount constant region 719, respectively. Sub-pixels 720 and 730 are also in the same structure as that of the sub-pixel 710. For example, the sub-pixels 720, 730 include respective aperture parts 721, 731, and an overlapping section 722R corresponds to an overlapping region 726R, a longitudinal light amount 756R, and a longitudinal aperture width 756Rw.

In the longitudinal light amount fluctuating region 718L, the longitudinal aperture width 748Lw changes continuously from roughly the center of the aperture part 711 towards the both ends of the first direction, respectively. This is the same in the longitudinal light amount fluctuating region 718R. The expression "continuously changes" regarding the change in the longitudinal aperture width is the same as "continuously changes" in the change in the longitudinal light amount described above.

Example 1 will be described in more details. In Example 1, as shown in FIG. 14A, the overlapping regions 716L 716R, the non-overlapping region 717, the longitudinal light amount constant region 719, and the longitudinal light amount fluctuating regions 718L, 718R exist by corresponding to the overlapping sections 712L, 712R, the non-overlapping section 713, the longitudinal light amount constant section 715, and the longitudinal light amount fluctuating sections 714L, 714R in the positions of the first direction x as in the case of Example 1 of the first exemplary embodiment. Note here that the angles ψ1 and ψ2 of each slit 102 are the same as those in FIG. 3C described in Example 1 of the first exemplary embodiment.

Further, the structure of the longitudinal aperture width is as shown by a plot 14c of FIG. 14C. In Example of the first exemplary embodiment, the longitudinal aperture width is always constant regardless of the positions in the first direction. In the meantime, in Example of the third exemplary embodiment, the longitudinal aperture width 748Lw of the longitudinal light amount fluctuating region 718L changes to continuously decrease from the maximum value Yh to the minimum value Yl from the overlapping section 712L towards the longitudinal light amount constant section 715. Further, the longitudinal aperture width 749w of the longitudinal light amount constant region 719 is constant (minimum value Yl) regardless of the positions in the first direction x, and the sum of the longitudinal aperture widths 746Lw, 756Rw in the overlapping regions 716L, 726R is constant (maximum value Yh) regardless of the positions in the first direction x.

The angles of each slot 102 in the longitudinal light amount fluctuating section 714R is designed to bend from ψ1 to ψ2 at mutually different positions in the first direction x. However, the angles may be designed to change moderately as in the case of Example 2 of the first exemplary embodiment. Further, it is the same as in the case of the first exemplary embodiment that the sum of the longitudinal aperture widths 746Lw, 756Rw or the sum of the longitudinal light amounts 746L, 756R does not necessarily need to be constant with respect to the positions in the first direction x.

By using the longitudinal aperture widths shown by a plot 14c in FIG. 14C, the relation between the positions in the first direction x and the longitudinal light amount becomes as in a plot 14b of FIG. 14B. In FIG. 14B, the plot 3b of Example 1 of the first exemplary embodiment in which the longitudinal aperture width is always constant (maximum value Yh) regardless of the positions in the first direction x is also written for making a comparison.

With Example 1, through changing the longitudinal aperture width 748Lw in the longitudinal light amount fluctuating region 718L to continuously decrease from the overlapping section 712L towards the longitudinal light amount constant section 715, the difference between the maximum value Wh and the minimum value Wl of the longitudinal light amount can be made still larger compared to the case of Example 1 (plot 3b) of the first exemplary embodiment as shown by the plot 14b of FIG. 14B. Other structures, operations, and effects of Example 1 are same as those of the first exemplary embodiment.

Third Exemplary Embodiment (Example 2)

Example 2 of the third exemplary embodiment will be described by referring to FIG. 15A. A sub-pixel 760 includes an aperture part 761. The aperture part 761 is divided into overlapping sections 762L, 762R and a non-overlapping section 763. The non-overlapping section 763 is divided into longitudinal light amount fluctuating sections 764L, 764R and longitudinal light amount constant section 765. The overlapping sections 762L, 762R correspond to overlapping regions 766L, 766R, the non-overlapping section 763 corresponds to a non-overlapping region 767, the longitudinal light amount fluctuating sections 764L, 764R correspond to longitudinal light amount fluctuating regions 768L, 768R, and the longitudinal light amount constant section 765 corresponds to a longitudinal light amount constant region 769, respectively. A longitudinal light amount 796L and a longitudinal aperture width 796Lw correspond to the overlapping region 766L, a longitudinal light amount 798L and a longitudinal aperture width 798Lw correspond to the longitudinal light amount fluctuating region 768L, and a longitudinal light amount 799 and a longitudinal aperture width 799w correspond to the longitudinal light amount constant region 769, respectively. Sub-pixels 770 and 780 are also in the same structure as that of the sub-pixel 760. For example, the sub-pixels 770, 780 include respective aperture parts 771, 781, and an overlapping section 772R corresponds to an overlapping region 776R, a longitudinal light amount 806R, and a longitudinal aperture width 806Rw. In the longitudinal light amount fluctuating region 768L, the longitudinal aperture width 798Lw changes continuously from roughly the center of the aperture part 761 towards the both ends of the first direction x, respectively. This is the same in the longitudinal light amount fluctuating region 768R.

Example 2 will be described in more details. In Example 2, the longitudinal aperture width 798Lw in the longitudinal light amount fluctuating region 768L continuously increases from the overlapping section 762R towards the longitudinal light amount constant section 765 as shown in FIG. 15A and FIG. 15C (plot 15c). With Example 2, through using such longitudinal aperture part 798Lw, the difference between the maximum value Wh and the minimum value Wl of the longitudinal light amount can be made still smaller compared to the case of Example 1 (plot 3b) of the first exemplary embodiment as shown by a plot 15b of FIG. 15B. Other structures, operations, and effects of Example 2 are the same as those of Example 1 of the third exemplary embodiment.

With the third exemplary embodiment, the longitudinal light amount profile (amplitudes) can be controlled not only by the angles of the slits but by the longitudinal aperture widths. The structure of the third exemplary embodiment makes it possible to control both the slit angles and the longitudinal aperture widths arbitrarily according to the layout restricting conditions, so that it is possible to achieve fine stereoscopic display even in a case of high-definition pixels that have many layout restricting conditions.

Fourth Exemplary Embodiment (Example 1)

A fourth exemplary embodiment is a structure which also changes the longitudinal aperture width in addition to changing the longitudinal light amount described in the second exemplary embodiment.

Example 1 of the fourth exemplary embodiment will be described by referring to FIG. 16A. A sub-pixel 810 includes an aperture part 811. The aperture part 811 is divided into overlapping sections 812L, 812R and a non-overlapping section 813. The non-overlapping section 813 is divided into longitudinal light amount fluctuating sections 814L, 814R and a longitudinal light amount constant section 815. The overlapping sections 812L, 812R correspond to overlapping regions 816L, 816R, the non-overlapping section 813 corresponds to a non-overlapping region 817, the longitudinal light amount fluctuating sections 814L, 814R correspond to longitudinal light amount fluctuating regions 818L, 818R, and the longitudinal light amount constant section 815 corresponds to a longitudinal light amount constant region 819, respectively. A longitudinal light amount 846L and a longitudinal aperture width 846Lw correspond to the overlapping region 816L, a longitudinal light amount 848L and a longitudinal aperture width 848Lw correspond to the longitudinal light amount fluctuating region 818L, and a longitudinal light amount 849 and a longitudinal aperture width 849w correspond to the longitudinal light amount constant region 819, respectively. Sub-pixels 820 and 830 are also in the same structure as that of the sub-pixel 810. For example, the sub-pixels 820, 830 include respective aperture parts 821, 831, and an overlapping section 822R corresponds to an overlapping region 826R, a longitudinal light amount 856R, and a longitudinal aperture width 856Rw.

In the longitudinal light amount fluctuating region 818L, the longitudinal aperture width 848Lw changes continuously from roughly the center of the aperture part 811 towards the both ends of the first direction, respectively. This is the same in the longitudinal light amount fluctuating region 818R.

Example 1 will be described in more details. In Example 1, as shown in FIG. 16A, the overlapping regions 816L 816R, the non-overlapping region 817, the longitudinal light amount constant region 819, and the longitudinal light amount fluctuating regions 818L, 818R exist by corresponding to the overlapping sections 812L, 812R, the non-overlapping section 813, the longitudinal light amount constant section 815, and the longitudinal light amount fluctuating sections 814L, 814R in the positions of the first direction x as in the case of the second exemplary embodiment.

Further, the structure of the longitudinal aperture width is as shown by a plot 16c of FIG. 16C. In the second exemplary embodiment, the longitudinal aperture width is always constant regardless of the positions in the first direction. In the meantime, in Example 1 of the fourth exemplary embodiment, the longitudinal aperture width 848Lw of the longitudinal light amount fluctuating region 818L changes to continuously decrease from the maximum value Yh to the minimum value Yl from the overlapping section 812L towards the longitudinal light amount constant section 815. Further, the longitudinal aperture width 849w of the longitudinal light amount constant region 819 is constant (minimum value Yl) regardless of the positions in the first direction x, and the sum of the longitudinal aperture widths 846Lw, 856Rw in the overlapping regions 816L, 826R is constant (maximum value Yh) regardless of the positions in the first direction x. Note that it is the same as in the case of the second exemplary embodiment that the sum of the longitudinal light amounts 846L and 856R does not essentially need to be constant with respect to the positions in the first direction x.

By using the longitudinal aperture widths shown by the plot 16c in FIG. 16C, the relation between the positions in the first direction x and the longitudinal light amount becomes as in the plot 16b of FIG. 16B. In FIG. 16B, the plot 11b of the longitudinal light amount of the second exemplary embodiment in which the longitudinal aperture width is always constant (maximum value Yh) regardless of the positions in the first direction x is also written for making a comparison.

With Example 1, through changing the longitudinal aperture width 848Lw in the longitudinal light amount fluctuating region 818L to continuously decrease from the overlapping section 812L towards the longitudinal light amount constant section 815, the difference between the maximum value Wh and the minimum value Wl of the longitudinal light amount can be made still larger compared to the case of the second exemplary embodiment (plot 11b) as shown by the plot 16b of FIG. 16B. Other structures, operations, and effects of Example 1 are the same as those of the second exemplary embodiment.

Fourth Exemplary Embodiment (Example 2)

Example 2 of the fourth exemplary embodiment will be described by referring to FIG. 17A. A sub-pixel 860 includes an aperture part 861. The aperture part 861 is divided into overlapping sections 862L, 862R and a non-overlapping section 863. The non-overlapping section 863 is divided into longitudinal light amount fluctuating sections 864L, 864R and a longitudinal light amount constant section 865. The overlapping sections 862L, 862R correspond to overlapping regions 866L, 866R, the non-overlapping section 863 corresponds to a non-overlapping region 867, the longitudinal light amount fluctuating sections 864L, 864R correspond to longitudinal light amount fluctuating regions 868L, 868R, and the longitudinal light amount constant section 865 corresponds to a longitudinal light amount constant region 869, respectively. A longitudinal light amount 896L and a longitudinal aperture width 896Lw correspond to the overlapping region 866L, a longitudinal light amount 858L and a longitudinal aperture width 858Lw correspond to the longitudinal light amount fluctuating region 868L, and a longitudinal light amount 899 and a longitudinal aperture width 899w correspond to the longitudinal light amount constant region 869, respectively. Sub-pixels 870 and 880 are also in the same structure as that of the sub-pixel 860. For example, the sub-pixels 870, 880 include respective aperture parts 871, 881, and an overlapping section 872R corresponds to an overlapping region 876R, a longitudinal light amount 906R, and a longitudinal aperture width 906Rw. In the longitudinal light amount fluctuating region 868L, the longitudinal aperture width 858Lw changes continuously from roughly the center of the aperture part 861 towards the both ends of the first direction x, respectively. This is the same in the longitudinal light amount fluctuating region 868R.

Example 2 will be described in more details. In Example 2, the longitudinal aperture width 858Lw in the longitudinal light amount fluctuating region 868L continuously increases from the overlapping section 862L towards the longitudinal light amount constant section 865 as shown in FIG. 17A and FIG. 17C (plot 17c). With Example 2, through using such longitudinal aperture width 858Lw, the difference between the maximum value Wh and the minimum value Wl of the longitudinal light amount can be made still smaller compared to the case of the second exemplary embodiment 2 (plot 11b) as shown by a plot 17b of FIG. 17B. Other structures, operations, and effects of the second exemplary embodiment are the same as those of Example 1 of the fourth exemplary embodiment.

In the fourth exemplary embodiment, white moiré is achieved by changing both the longitudinal light amount and the longitudinal aperture width for the positions in the first direction. Thereby, white moiré can be maintained by the longitudinal light amount even when rounding is generated in the longitudinal aperture part due to variation in the processing precision. Further, since white moiré can be maintained by the longitudinal aperture width even when there is variation generated in the longitudinal light amount, the influence of manufacture variation can be lightened.

Fifth Exemplary Embodiment (Comparative Example)

Before describing Examples of a fifth exemplary embodiment, Comparative Example is first shown in FIG. 18A. Respective aperture parts 901UL, 901DL, 901UR, and 901DR of sub-pixels 900UL, 900DL, 900UR, and 900DR of Comparative Example are in the same shape as the aperture part and longitudinal light amount of the second exemplary embodiment, and are disposed in a matrix form of 2×2. The unit lenses of the lens 1 as the light-ray control modules are disposed at the positions corresponding to a pair of sub-pixels 900UL (900DL), 900UR (900DR), and arranged repeatedly along the first direction x. FIG. 18B is a graph showing the change in the luminance distribution for the second direction y in the aperture parts 901UL and 901DL as a plot 902L. Similarly, FIG. 18C is a graph showing the change in the luminance distribution for the second direction y in the aperture parts 901UR and 901DR as a plot 902R.

The aperture parts 901UL, 901UR are disposed by being shifted from each other in the second direction y and the aperture parts 901DL, 901DR are disposed by being shifted from each other in the second direction y, so that there is a difference generated in the maximum values of the changes in the luminance distributions in the second direction y between the plot 902L and the plot 902R. The lens 1 cannot distribute the light rays towards the second direction y, so that different luminance distributions for the second direction y are projected in that state to the observing plane. As a result, a sense of granularity is to be perceived in the image.

Fifth Exemplary Embodiment (Example 1)

FIG. 19A shows sub-pixels 910UL, 910DL, 910UR, and 910DR as Example 1 of the fifth exemplary embodiment. Respective aperture parts 911UL, 911DL, 911UR, and 911DR of the sub-pixels 910UL, 910DL, 910UR, and 910DR are in a shape acquired by expanding the shape of the aperture part of Comparative Example described above in the second direction y, and are disposed in a matrix form of 2×2. The unit lenses of the lens 1 as the light-ray control modules are disposed at the positions corresponding to a pair of sub-pixels 910UL (910DL), 910UR (910DR), and arranged repeatedly along the first direction x. The aperture part 911UR includes the overlapping region, the longitudinal light amount fluctuating region, and the longitudinal light amount constant region like the aperture part and the longitudinal light amount of the second exemplary embodiment, for example. This is the same for the other aperture parts 911UL, 911DL, and 911DR.

FIG. 19B is a graph showing the change in the luminance distribution for the second direction y in the aperture parts 911UL and 911DL as a plot 912L. Similarly, FIG. 19C is a graph showing the change in the luminance distribution for the second direction y in the aperture parts 911UR and 911DR as a plot 912R. Unlike Comparative Example (FIG. 18B and FIG. 18C), there is almost no shift generated in the maximum values in the changes of the luminance distributions in the second direction y with Example 1. Therefore, with Example 1, the luminance increase/decrease generated at different positions in the viewpoint direction of the observing plane becomes almost the same. As a result, a sense of granularity can be suppressed.

Fifth Exemplary Embodiment (Example 2)

FIG. 20A shows sub-pixels 920UL, 920DL, 920UR, and 920DR as Example 2 of the fifth exemplary embodiment. Respective aperture parts 921UL, 921DL, 921UR, and 921DR of the sub-pixels 920UL, 920DL, 920UR, and 920DR are in a shape acquired by expanding a shape different from the aperture part of Example 1 described above in the second direction y, and are disposed in a matrix form of 2×2. The unit lenses of the lens 1 as the light-ray control modules are disposed at the positions corresponding to a pair of sub-pixels 920UL (920DL), 920UR (920DR), and arranged repeatedly along the first direction x. The aperture part 921UR includes the overlapping region, the longitudinal light amount fluctuating region, and the longitudinal light amount constant region like the aperture part and the longitudinal light amount of the second exemplary embodiment, for example. This is the same for the other aperture parts 921UL, 921DL, and 921DR.

FIG. 20B is a graph showing the change in the luminance distribution for the second direction y in the aperture parts 921UL and 921DL as a plot 922L. Similarly, FIG. 20C is a graph showing the change in the luminance distribution for the second direction y in the aperture parts 921UR and 921DR as a plot 922R. Unlike Comparative Example (FIG. 18B and FIG. 18C), there is almost no shifted generated in the maximum values in the changes of the luminance distributions in the second direction y with Example 2. Therefore, with Example 2, the luminance increase/decrease generated at different positions in the viewpoint direction of the observing plane becomes almost the same. As a result, a sense of granularity can be suppressed.

Fifth Exemplary Embodiment (Summary)

Note here that the distance between the maximum value and the minimum value of the aperture positions in the second direction of a single sub-pixel is defined as an optical longitudinal aperture section. That is, the maximum value of the difference between the position at one end of the aperture part in the second direction and the position at the other end of the aperture part in the second direction is defined as "longitudinal aperture section". In the aperture part 901UL of Comparative Example shown in FIG. 18A, the difference between the position at one end 904 in the second direction y and the position at the other end 905 in the second direction y is the longitudinal aperture section 903. In the aperture part 911UL of Example 1 shown in FIG. 19A, the difference between the position at one end 914 in the second direction y and the position at the other end 915 in the second direction y is the longitudinal aperture section 913. In the aperture part 921UL of Example 2 shown in FIG. 20A, the difference between the position at one end 924 in the second direction y and the position at the other end 925 in the second direction y is the longitudinal aperture section 923. Further, as in the cases of the third and fourth exemplary embodiments, the width of the aperture part in the second direction is defined as "longitudinal aperture width".

The sub-pixel according to the fifth exemplary embodiment has following features. In Comparative Example shown in FIG. 18A, the value of the longitudinal aperture section 903 and the value of the largest longitudinal aperture width among the longitudinal aperture widths at arbitrary positions in the first direction x are the same. In the meantime, in Example 1 shown in FIG. 19A, the value of the longitudinal aperture section 913 is larger than the value of the largest longitudinal aperture width among the longitudinal aperture widths at arbitrary positions in the first direction x, and the positions of the longitudinal aperture sections 913 in the second direction y coincide with each other between the longitudinal aperture sections neighboring to each other in the first direction x. Similarly, in Example 2 shown in FIG. 20A, the value of the longitudinal aperture section 923 is larger than the value of the largest longitudinal aperture width among the longitudinal aperture widths at arbitrary positions in the first direction x, and the positions of the longitudinal aperture sections 923 in the second direction y coincide with each other between the longitudinal aperture sections neighboring to each other in the first direction x. This makes it possible with the fifth exemplary embodiment to suppress a sense of granularity perceived in images on the observing plane.

The fifth exemplary embodiment can also be expressed as follows. In Example 1 shown in FIG. 19A, the difference between the position at one end of the aperture part 911UL in the second direction y and the position at the other end of the aperture part 911UL in the second direction y becomes the maximum between the one end 914 and the other end 915. The region of the maximum value is defined as the longitudinal aperture section 913. In that case, the longitudinal aperture section 913 takes the value larger than the maximum value of the longitudinal aperture width of the aperture part 911UL. Further, the positions of one end 914 and the other end 915 in the second direction y constituting the longitudinal aperture section 913 are the same in the aperture parts 911UL and 911UR which are neighboring to each other in the first direction x. This is the same in Example 2 shown in FIG. 20A.

In the cases of the aperture parts according to not only the second exemplary embodiment but also the first, third, and fourth exemplary embodiments, the fifth exemplary embodiment can also be employed in the same manner. Other structures, operations, and effects of the fifth exemplary embodiment are the same as those of the first and second exemplary embodiments.

Sixth Exemplary Embodiment

A sixth exemplary embodiment will be described by referring to FIG. 25A and FIG. 25B. A sub-pixel 1100 includes an aperture part 1110. The aperture part 1110 is divided into an overlapping section A1101, an overlapping section B1105, an overlapping section C1106, and a longitudinal light amount constant section 1103. The longitudinal light amount constant section 1103 is a non-overlapping section that does not overlap, in the second direction y, with sub-pixels 1200, 1300 neighboring to each other in the first direction x. The overlapping section A1101, the overlapping section B1105, and the overlapping section C1106 are all overlapping sections which overlap, in the second direction y, with the sub-pixels 1200, 1300 neighboring to each other in the first direction x. In the sub-pixel 1100, an overlapping region A1121 corresponds to the overlapping section A1101, an overlapping region B1125 corresponds to the overlapping section B1105, an overlapping region C1126 corresponds to the overlapping section C1106, and a longitudinal light amount constant region 1123 corresponds to the longitudinal light amount constant section 1103.

The sub-pixels 1200 and 1300 neighboring to the sub-pixel 1100 in the first direction x are also in the same structure as that of the sub-pixel 1100. An overlapping section A1101L of the sub-pixel 1100 is the same section as an overlapping section A1201R of the sub-pixel 1200, an overlapping section B1105L of the sub-pixel 1100 is the same section as an overlapping section C1206R of the sub-pixel 1200, and an overlapping section C1106L of the sub-pixel 1100 is the same section as an overlapping section B1205R of the sub-pixel 1200. Similarly, between the sub-pixel 1100 and the sub-pixel 1300, an overlapping section A1101R is the same section as an overlapping section A1301L, an overlapping section B1105R is the same section as an overlapping section C1306L, and an overlapping section C1106R is the same section as an overlapping section B1305L.

The longitudinal light amount in each section of the sub-pixel 1100 is as follows. In the overlapping sections between with the sub-pixel 1200, the sum of the longitudinal light amounts in the overlapping section A1101L (1201R) is "1111L+1211R", the sum of the longitudinal light amounts in the overlapping section B1105L (1206R) is "1115L+1216R", the sum of the longitudinal light amounts in the overlapping section C1106L (1205R) is "1116L+1215R". Similarly, in the overlapping sections between with the sub-pixel 1300, the sum of the longitudinal light amounts in the overlapping section A1101R (1301L) is "1111R+1311L", the sum of the longitudinal light amounts in the overlapping section B1105R (1306L) is "1115R+1316L", and the sum of the longitudinal light amounts in the overlapping section C1106R (1305L) is "1116R+1315L".

The relation between the longitudinal light amount (sum of the longitudinal light amounts) and the positions in the first direction x is as follows. The sum of the longitudinal light amounts in the overlapping section A1101L, "1111L+1211R", is constant regardless of the positions in the first direction x. Similarly, the longitudinal light amount 1113 in the longitudinal light amount constant section 1103 is constant regardless of the positions in the first direction x. In the meantime, the overlapping section B1105L (1206R) exists between the overlapping section A1101L (1201R) and the longitudinal light amount constant section 1103, and the sum of the longitudinal amounts thereof, "1115L+1216R", continuously and linearly changes depending on the changes in the position in the first direction x. The overlapping section C1106L (1205R) exists between the overlapping section A1101L (1201R) and the longitudinal light amount constant section 1203 of the sub-pixel 1200, and the sum of the longitudinal amounts thereof, "1116L+1215R", continuously and linearly changes depending on the changes in the position in the first direction x as well.

In other words, the overlapping region A1121, the overlapping region B1125, and the overlapping region C1126 can be described as follows. The overlapping region A can also be referred to as a longitudinal light amount sum constant region. It is because the sum of the longitudinal light amount in the overlapping region A1121L (1121R) and the longitudinal light amount in the overlapping region A1221R (1321L) of the sub-pixel 1200 (1300) which overlaps in the second direction y is constant. Further, the overlapping regions B and C can also be referred to as a longitudinal light amount sum fluctuating regions. It is because the sum of the longitudinal light amount in the overlapping region B1125L (1125R), the overlapping region C1126L (1126R) and the longitudinal light amount in the overlapping region C1226R (1326L), the overlapping region B1225R (1325L) of the sub-pixel 1200 (1300) which overlaps in the second direction y fluctuates depending on the positions in the first direction x.

The relation between the positions in the first direction x and the longitudinal light amount (sum of the longitudinal light amounts) is as shown by a plot 006 of FIG. 25B. It is the same as the cases of the first and second exemplary embodiments that the sums of the longitudinal light amounts in the overlapping sections A1101L, 1101R, "1111L+1211R" and "1111R+1311L", take the maximum value Wh and that the longitudinal light amount 1113 in the longitudinal light amount constant section 1103 takes the minimum value Wl.

The difference of the sixth exemplary embodiment with respect to the second exemplary embodiment is as follows. That is, the overlapping region that overlaps with the neighboring sub-pixel in the second direction y is divided into three sections as described above, the sum of the longitudinal light amounts in roughly the center of the overlapping region is constant, and the sum of the longitudinal light amounts at both ends of the overlapping region fluctuates. In other words, the overlapping regions A, B, and C include two longitudinal light amount sum fluctuating regions (overlapping regions B, C) in which the sum of the longitudinal light amounts with the neighboring two sub-pixels continuously changes from roughly the center of the overlapping regions A, B, and C towards the both ends of the first direction x, respectively. Each of the sums of the longitudinal light amounts in the overlapping regions A, B, and C is larger than the longitudinal light amount in roughly the center of the aperture part. The relation between the change in the longitudinal light amount and the positions in the first direction in the structure of the sixth exemplary embodiment is the same as the case of the second exemplary embodiment, so that the same effects as those of the second exemplary embodiment can be acquired.

The other contents regarding the entire structures, the light dimming module, the lens, and the like of the sixth exemplary embodiment are the same as those of the second exemplary embodiment.

A plurality of structural elements described in each of the above exemplary embodiments are not limited to those specifically described above. For example, in the explanations above, the light-ray control module is described as the structure using a lens. However, the light-ray control module is not limited to that. It is also possible to use an electro-optical element such as a liquid crystal lens or a parallax barrier. Furthermore, some of the structural elements shown in each of the exemplary embodiments can be omitted or the structural elements according to the different exemplary embodiments can be combined as appropriate.

A part of or a whole part of each of the above-described exemplary embodiments can be depicted as in following Supplementary Notes. However, it is to be noted that the present invention is not limited only to the following structures.

(Supplementary Note 1)

A stereoscopic display device, which includes:

a display panel including sub-pixels with optical aperture parts being disposed in a matrix form in a first direction and a second direction that is roughly perpendicular to the first direction; and a light-ray control module which is provided by opposing to the display panel for controlling light rays towards the first direction, wherein:

each of the aperture parts of two of the sub-pixels neighboring to each other in the first direction includes an overlapping region overlapping with each other in the second direction and a non-overlapping region not overlapping with each other;

provided that a light amount emitted from a linear aperture of the aperture part in parallel to the second direction is defined as a longitudinal light amount, the non-overlapping region includes a longitudinal light amount fluctuating region where the longitudinal light amount changes continuously from roughly a center of the aperture part towards both ends of the first direction, respectively; and a sum of the longitudinal light amounts of the two overlapping regions overlapping with each other located at a same position in the first direction is larger than the longitudinal light amount in roughly the center of the aperture part.

(Supplementary Note 2)

The stereoscopic display device as depicted in Supplementary Note 1, wherein the sum of the longitudinal light amounts of the two overlapping regions overlapping with each other located at a same position in the first direction is same at any positions in the first direction.

(Supplementary Note 3)

The stereoscopic display device as depicted in Supplementary Note 1 or 2, wherein provided that a width of the aperture part in the second direction is defined as a longitudinal aperture width, the longitudinal aperture width in the longitudinal light amount fluctuating region continuously changes from roughly the center of the aperture part towards the both ends of the first direction, respectively.

(Supplementary Note 4)

The stereoscopic display device as depicted in any one of Supplementary Notes 1 to 3, wherein:

the sub-pixel is an FFS mode liquid crystal display device and includes, inside the aperture part, a plurality of striped electrodes and slits provided in periphery of the electrodes;

an angle between a long-side direction of the slits and liquid crystal initial alignment is $\psi1$ in the overlapping region, and changes from $\psi1$ to $\psi2$ in the longitudinal light amount fluctuating region; and a relation of the angles satisfies $\psi1 \neq \psi2$.

(Supplementary Note 5)

The stereoscopic display device as depicted in any one of Supplementary Notes 1 to 3, which further includes a light dimming module that is provided by opposing to the display panel, wherein:

transmittance of the light dimming module is T1 in the overlapping region, and changes from T1 to T2 in the longitudinal light amount fluctuating region; and a relation of the transmittance satisfies T1>T2.

(Supplementary Note 6)

The stereoscopic display device as depicted in any one of Supplementary Notes 1 to 5, wherein provided that a width of the aperture part in the second direction is defined as a longitudinal aperture width and a maximum value of a difference between a position in the second direction at one end of the aperture part and a position in the second direction at other end of the aperture part is defined as a longitudinal aperture section, the longitudinal aperture section is larger than a maximum value of the longitudinal aperture width.

(Supplementary Note 7)

The stereoscopic display device as depicted in Supplementary Note 6, wherein the positions at the one end and the other end in the second direction forming the longitudinal aperture section are same between the aperture parts that are neighboring to each other in the first direction.

(Supplementary Note 8)

A stereoscopic display device, which includes:

a display panel including sub-pixels with optical aperture parts being disposed in a matrix form in a first direction and a second direction that is roughly perpendicular to the first direction; and a light-ray control module which is provided by opposing to the display panel for controlling light rays towards the first direction, wherein:

each of the aperture parts of two of the sub-pixels neighboring to each other in the first direction includes an overlapping region overlapping with each other in the second direction and a non-overlapping region not overlapping with each other;

provided that a light amount emitted from a linear aperture of the aperture part in parallel to the second direction is defined as a longitudinal light amount, the overlapping region includes two longitudinal light amount sum fluctuating regions where a sum of the longitudinal light amounts of the two neighboring sub-pixels continuously change from roughly a center of the overlapping region towards both ends of the first direction, respectively; and the sum of the longitudinal light amounts in the overlapping region is larger than the longitudinal light amount in roughly the center of the aperture part.

INDUSTRIAL APPLICABILITY

The present invention can be utilized to any types of stereoscopic display devices as long as the devices provide stereoscopic images to naked-eye observers, such as a liquid crystal display, an organic EL display, a plasma display, and the like.

What is claimed is:

1. A stereoscopic display device, comprising:

a display panel including sub-pixels with optical aperture parts being disposed in a matrix form in a first direction and a second direction that is perpendicular to the first direction; and a light-ray control module which is provided to the display panel for controlling light rays towards the first direction, wherein:

provided that, for all the sub-pixels, two of the sub-pixels neighboring to each other in the first direction are defined as a first sub-pixel and a second sub-pixel, respectively, each of the aperture parts of the first sub-pixel and the second sub-pixel includes an overlapping region where the first sub-pixel and the second sub-pixel overlap with each other in the second direction and a non-overlapping region where the first sub-pixel and the second sub-pixel do not overlap with each other;

a longitudinal light amount emitted from a linear aperture of the aperture part in parallel to the second direction, the non-overlapping region includes a longitudinal light amount constant region where the longitudinal light amount is constant regardless of positions in the first direction and a longitudinal light amount fluctuating region where the longitudinal light amount changes continuously from the longitudinal light amount constant region towards both ends of the first direction, respectively; and for all the first sub-pixels and the second sub-pixels arranged in the second direction, a sum of the longitudinal light amounts of the overlapping regions of the first sub-pixel and the second sub-pixel located on a same straight line which is in parallel with the second direction is larger than the longitudinal light amount in the longitudinal light amount constant region.

2. The stereoscopic display device as claimed in claim 1, wherein the sum of the longitudinal light amounts of the two overlapping regions overlapping with each other located at a same position in the first direction is same at any positions in the first direction.

3. The stereoscopic display device as claimed in claim 1, wherein provided that a width of the aperture part in the second direction is defined as a longitudinal aperture width, the longitudinal aperture width in the longitudinal light amount fluctuating region continuously changes from roughly the center of the aperture part towards the both ends of the first direction, respectively.

4. The stereoscopic display device as claimed in claim 1, further comprising a light dimming module that is provided by opposing to the display panel, wherein:

transmittance of the light dimming module is T1 in the overlapping region, and changes from T1 to T2 in the longitudinal light amount fluctuating region; and a relation of the transmittance satisfies T1>T2.

5. The stereoscopic display device as claimed in claim 1, wherein provided that a width of the aperture part in the second direction is defined as a longitudinal aperture width and a maximum value of a difference between a position in the second direction at one end of the aperture part and a position in the second direction at other end of the aperture part is defined as a longitudinal aperture section, the longitudinal aperture section is larger than a maximum value of the longitudinal aperture width.

6. The stereoscopic display device as claimed in claim 5, wherein the positions at the one end and the other end in the second direction forming the longitudinal aperture section are same between the aperture parts that are neighboring to each other in the first direction.

7. A stereoscopic display device, comprising:

a display panel including sub-pixels with optical aperture parts being disposed in a matrix form in a first direction and a second direction that is perpendicular to the first direction; and a light-ray control module which is provided to the display panel for controlling light rays towards the first direction, wherein:

provided that, for all the sub-pixels, two of the sub-pixels neighboring to each other in the first direction are defined as a first sub-pixel and a second sub-pixel respectively, each of the aperture parts of the first sub-pixel and the second sub-pixel includes an overlapping region where the first sub-pixel and the second sub-pixel overlap with each other in the second direction and a non-overlapping region where the first sub-pixel and the second sub-pixel do not overlap with each other;

a longitudinal light amount emitted from a linear aperture of the aperture part in parallel to the second direction, the non-overlapping region includes a longitudinal light amount constant region where the longitudinal light amount is constant regardless of positions in the first direction and a longitudinal light amount fluctuating region where the longitudinal light amount changes continuously from the longitudinal light amount constant region towards both ends of the first direction, respectively;

a sum of the longitudinal light amounts of the overlapping regions of the first sub-pixel and the second sub-pixel located on a same straight line which is in parallel with the second direction is larger than the longitudinal light amount in the longitudinal light amount constant region;

each of the sub-pixels is an FFS mode liquid crystal display device and includes, inside the aperture part, a plurality of striped electrodes and slits provided in periphery of the electrodes;

an angle between a long-side direction of the slits and liquid crystal initial alignment is $\psi 1$ in the overlapping region, and changes from $\psi 1$ to $\psi 2$ in the longitudinal light amount fluctuating region; and a relation of the angles satisfies $\psi 1 \neq \psi 2$, wherein the relation satisfies: a sum of the longitudinal light amounts of the overlapping regions of the first sub-pixel and the second sub-pixel located on a same straight line which is in parallel with the second direction is larger than the longitudinal light amount in the longitudinal light amount fluctuating region, which is larger than the longitudinal light amount in the longitudinal light amount constant region.

* * * * *